United States Patent
Charon et al.

(10) Patent No.: US 8,916,043 B2
(45) Date of Patent: Dec. 23, 2014

(54) COAL CONVERSION PROCESS AND PRODUCTS, COMPRISING TWO DIRECT EBULLATED BED LIQUEFACTION STAGES AND A FIXED BED HYDROCRACKING STAGE

(75) Inventors: Nadege Charon, Jardin (FR); Hugues Dulot, Lyons (FR); Alain Quignard, Roussillon (FR); Wilfried Weiss, Valencin (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 707 days.

(21) Appl. No.: 13/050,136

(22) Filed: Mar. 17, 2011

(65) Prior Publication Data
US 2011/0230688 A1 Sep. 22, 2011

(30) Foreign Application Priority Data
Mar. 18, 2010 (FR) ..................... 10 01080

(51) Int. Cl.
*C10G 1/06* (2006.01)
*C10G 1/08* (2006.01)
*C10G 1/00* (2006.01)
*C10L 1/08* (2006.01)
*C10G 1/04* (2006.01)
*C10L 1/04* (2006.01)

(52) U.S. Cl.
CPC .......... *C10G 1/002* (2013.01); *C10G 2300/308* (2013.01); *C10G 2300/1018* (2013.01); *C10G 2400/04* (2013.01); *C10G 2300/1077* (2013.01); *C10G 2400/02* (2013.01); *C10L 1/08* (2013.01); *C10G 2300/307* (2013.01); *Y02E 50/32* (2013.01); *C10G 1/042* (2013.01); *C10G 2300/1003* (2013.01); *C10L 1/04* (2013.01); *C10G 2300/107* (2013.01); *C10G 2400/08* (2013.01); *C10G 2300/44* (2013.01); *C10G 2300/1033* (2013.01); *C10G 2300/1074* (2013.01); *C10G 1/065* (2013.01); *C10G 2300/301* (2013.01); *C10G 2300/1014* (2013.01); *C10G 2300/4018* (2013.01)
USPC .......................................................... 208/413

(58) Field of Classification Search
USPC .......................................................... 208/413
See application file for complete search history.

(56) References Cited

U.S. PATENT DOCUMENTS

| 3,575,847 | A | * | 4/1971 | Sprow et al. | ....................... 8/112 |
| 4,345,989 | A | * | 8/1982 | Vernon et al. | .................. 208/419 |
| 4,569,749 | A | | 2/1986 | Wright | |
| 4,816,141 | A | * | 3/1989 | McLean et al. | ................ 208/413 |
| 4,874,506 | A | * | 10/1989 | MacArthur et al. | ........... 208/413 |

(Continued)

FOREIGN PATENT DOCUMENTS

DE 3443172 A1 8/1985
WO 2010048251 A2 4/2010

OTHER PUBLICATIONS

Preliminary Search Report, dated Oct. 20, 2010, issued in corresponding foreign application No. FR 1001080.

*Primary Examiner* — Randy Boyer
*Assistant Examiner* — Juan Valencia
(74) *Attorney, Agent, or Firm* — Millen, White, Zelano & Branigan, P.C.

(57) ABSTRACT

A process for the conversion of coal into fuel bases comprises two successive direct liquefaction stages in ebullated bed reactors followed by a fixed bed hydrocracking stage. This process can produce excellent quality fuel bases (kerosene and diesel).

16 Claims, 5 Drawing Sheets

(56) References Cited

U.S. PATENT DOCUMENTS

| | | |
|---|---|---|
| 5,045,180 A | 9/1991 | Comolli |
| 2005/0236303 A1* | 10/2005 | Soled et al. ............... 208/216 R |
| 2007/0021636 A1 | 1/2007 | Bosch |
| 2011/0079541 A1* | 4/2011 | Koseoglu ....................... 208/59 |
| 2013/0186805 A1* | 7/2013 | Koseoglu et al. ............... 208/89 |

* cited by examiner

COAL CONVERSION PROCESS AND PRODUCTS, COMPRISING TWO DIRECT EBULLATED BED LIQUEFACTION STAGES AND A FIXED BED HYDROCRACKING STAGE

The present invention relates to a process for the conversion of coal, comprising two successive direct liquefaction stages in ebullated bed reactors followed by a fractionation and a fixed bed hydrocracking stage. This process is for the production of fuel bases, especially kerosene and gas oil, of very high quality.

Coal liquefaction, better known by the term "coal-to-liquids", or CTL, consists of converting coal into liquid hydrocarbons such as fuels or petrochemicals products. Coal liquefaction is based on two differently designed routes:

The "indirect" route, based on BASF's 1913 patent and the work of the chemists Fischer and Tropsch in 1922, consists in a first stage of gasifying coal to a gas composed of carbon monoxide and hydrogen known as synthesis gas or "syngas". This gas is then converted into liquid hydrocarbons by the Fischer-Tropsch process, using iron catalysts. That process means that conventional coals of the bituminous or sub-bituminous type can be used, as well as less mature coals such as lignites. The indirect route, also known by the term "indirect coal liquefaction", or ICL, is used commercially in South Africa.

The "direct" route, based on the work by Bergius in 1913, consists of reacting coal in a solvent in the presence of hydrogen at high temperatures and pressures to produce liquid hydrocarbons. The product of direct liquefaction is then treated and purified in order to bring the products up to the specifications in force. That liquefaction process is usually restricted to bituminous and sub-bituminous type coals. The direct route, also known by the term "direct coal liquefaction", or DCL, is used commercially in China.

The products obtained by the indirect or direct route are different and each route has advantages and disadvantages. The indirect route can conventionally produce paraffinic naphtha and diesel with a very high cetane number with very few impurities since it is primarily composed of paraffinic molecules. The direct route produces fuel bases with a naphtheno-aromatic nature with lower cetane indices for the diesel than in the case of the indirect route and generally above specifications. Although the direct route conventionally produces lower quality products, it has the advantage of producing a better naphtha and diesel yield than the indirect route. Conventional yields are 3.5 barrels per tonne (b/t) of organic coal matter (ash free dry coal) for the direct route and 2.5 barrels per tonne for the indirect route.

Thus, the aim of the present invention is to propose a high yield coal conversion process producing fuel bases.

The aim of the present invention is also to propose gas oil and kerosene from this process which are of excellent quality in terms of cetane number or smoke point respectively.

PRIOR ART

In the 1960s, Hydrocarbon Research Inc developed a process for the direct liquefaction of coal, termed "H-Coal single step", which is described in U.S. Pat. No. 3,519,553 and U.S. Pat. No. 3,791,959. That process uses an ebullated bed reactor with a hydroconversion catalyst.

In order to increase the yields of fuel bases, a process using two successive ebullated bed reactors was developed by the same company in the 1970s, termed "H-Coal two step" or H-Coal TS®.

Thus, U.S. Pat. No. 4,874,506 describes a process for the direct liquefaction of coal in two successive stages using ebullated bed reactors. In that process, the coal is initially ground and mixed with a solvent from the process in order to form a suspension which is then injected into the first ebullated bed reactor in the presence of a hydroconversion catalyst. That first reactor operates at a temperature in the range 371° C. to 427° C. (700° F. to 800° F.), a partial pressure of hydrogen in the range 6.9 to 27.6 MPa (1000 to 4000 psig), and mass velocity per hour in the range 0.1 to 1.2 $h^{-1}$. The partially hydrogenated effluent is then injected directly into a second ebullated bed reactor operating under more severe operating conditions, in particular at a temperature in the range 404° C. to 460° C. (760° F. to 860° F.) and at a partial pressure of hydrogen in the range 6.9 to 27.6 MPa (1000 to 4000 psig) and at an hourly mass velocity in the range 0.1 to 1.2 $h^{-1}$. The effluent from the second liquefaction reactor undergoes a gas/liquid separation then a distillation. The heavy fraction is recycled as the solvent to prepare the suspension with the coal. The light fraction is sent to an optional fixed bed hydrotreatment stage using CoMo or NiMo catalysts on alumina to reduce the sulphur and nitrogen contents.

The U.S. Pat. No. 4,400,263 from the same company describes a direct single-stage coal liquefaction process using a single ebullated bed reactor (T=427-454° C. (800-850° F.), partial pressure of hydrogen 13.8 to 22 MPa (2000-3200 psi). The effluent from the liquefaction reactor undergoes a separation stage without decompression and the gaseous and liquid effluents are then sent to an optional fixed bed hydrotreatment stage to reduce the sulphur and nitrogen contents. The quality of the products obtained is not described.

More recently, patent application EP 1 783 194 from Shenhua describes a process for the direct liquefaction of coal in two successive stages in slurry reactors using a dispersed catalyst, i.e. with a catalyst particle size much smaller than that of the catalysts used in an ebullated bed. That catalyst passes through the reactors with the feeds and the products undergoing conversion. The operating conditions are identical in the two reactors (T=430-465° C., pressure 15-19 MPa). After liquefaction and separation of the liquid phase, the effluent undergoes a suspended bed hydrotreatment stage using iron-based catalysts. That application, aimed at increasing the yields of fuel bases, does not disclose characteristics concerning the quality of the products obtained.

AIM OF THE INVENTION

The goal of the industrial development of direct coal liquefaction is to obtain fuel bases in a high yield and with qualities which are acceptable having regard to the final specifications and/or restrictions imposed by the subsequent transformation stages.

The present invention aims to improve the direct coal liquefaction process known as H-Coal TS® by adding a fixed bed hydrocracking stage after the two ebullated bed liquefaction stages. The research carried out by the Applicant on direct coal liquefaction has led to the discovery that, surprisingly, this process for the direct liquefaction of coal in two successive ebullated bed stages followed by a fixed bed hydrocracking stage can be used to obtain very high quality fuel bases, especially kerosene and diesel. These results are not obtained in the case of a supplementary hydrotreatment stage. In fact, and surprisingly, the gas oil obtained by this process has an excellent cetane number which complies with European and American specifications despite a very high naphthenes content. Similarly, the kerosene has a smoke point which complies with European and American specifications.

These results are all the more astonishing since fuel bases produced by direct coal liquefaction are conventionally known to be of poor quality failing to comply with specifications regarding combustion because of their high naphthenoaromatics content.

DETAILED DESCRIPTION

The present invention concerns a process for the conversion of coal into fuel bases comprising two-stages for direct ebullated bed coal liquefaction followed by a stage for fixed bed hydrocracking and incorporating an intermediate fractionation with or without decompression between the liquefaction and hydrocracking stages. The present invention also concerns the products derived from this process, especially very high quality kerosene and gas oil.

More particularly, the present invention concerns a process for the conversion of coal into fuel bases, comprising the following stages:
  a) preparing a suspension of coal particles in a solvent, preferably a hydrogen-donor solvent;
  b) liquefying said suspension in the presence of hydrogen in at least one ebullated bed reactor containing a supported catalyst;
  c) liquefying at least a portion of the effluent obtained in stage b) in the presence of hydrogen in at least one ebullated bed reactor containing a supported catalyst and operating at a temperature at least 10° C. higher than that of stage b);
said process being characterized in that it comprises the following stages:
  d) separating the effluent obtained at the end of stage c) into a light hydrocarbon fraction containing compounds boiling at at most 500° C. and a residual fraction;
  e) hydrocracking, in the presence of hydrogen, at least a portion of the "light" hydrocarbon fraction obtained at the end of stage d) in at least one reactor containing a fixed bed of hydrocracking catalyst, the conversion of the 200° C.+ fraction in the hydrocracking stage being more than 10% by weight, preferably in the range 20% to 100% by weight;
  f) separating the effluent obtained at the end of stage e) into at least one liquid fraction containing naphtha, kerosene and/or diesel and a heavy fraction.

The Feed

The feed used is coal, for example bituminous or sub-bituminous in type. However, lignites may also be used.

Ebullated bed technology also means that coal can be converted by co-treatment with other feeds that are difficult to convert in fixed bed hydrotreatment/hydroconversion processes. These feeds may be of a hydrocarbon (oil) nature, a non-oil nature or a renewable nature.

The hydrocarbon (oil) feeds concerned are feeds such as oil residues, vacuum distillates of oil origin, crude oils, synthetic crudes, topped crude oils, deasphalted oils, resins from deasphalting, asphalts or pitches from deasphalting, derivatives from oil conversion processes (such as LCO, HCO, FCC slurry, heavy GO/VGO from coking, residue from visbreaking or similar thermal processes, etc), aromatic extracts derived from production lines for lubricant bases, bituminous sands or their derivatives, bituminous schists or their derivatives, or mixtures of such feeds. More generally, the term "hydrocarbon feeds" includes feeds containing at least 50% by weight of product distilling above 250° C. and at least 25% by weight distilling above 350° C.

The non-oil feeds concerned are feeds such as industrial hydrocarbon and/or polymeric waste such as recycled polymers from used tyres, spent residue from polymers deriving, for example, from recycled automotive vehicles, organic or plastic household waste, or mixtures of such feeds.

Feeds containing at least a portion of the effluents derived from the Fischer-Tropsch synthesis, carried out using synthesis gas produced by gasification of oil, non-oil (coal, gas) or renewable (biomass) type feeds, may also undergo a conversion co-treatment with coal in an ebullated bed type technique. Tars and residues derived from said gasification may also be used as a co-treatment feed; these are generally impossible or very difficult to upgrade.

It is also possible to treat coal with feeds derived from renewable sources such as oils and fats of vegetable or animal origin, lignocellulose biomass or one or more constituents of lignocellulose biomass selected from the group formed by cellulose, hemicellulose and/or lignin, or mixtures of such feeds.

The animal or vegetable oils contain triglycerides and/or free fatty acids and/or esters. The vegetable oils may advantageously be crude or refined, completely or partially, and derive from the following plants: rape, sunflower, soya, palm, palm nut, olive, coconut, jatropha; this list is not limiting. Algae or fish oils are also appropriate. The oils may also be produced from genetically modified organisms. The animal fats are advantageously selected from lard and fats composed of food industry residues or derived from the restaurant industry.

The lignocellulose raw material may be constituted by wood or vegetable waste. Other non-limiting examples of lignocellulose biomass material are residues from farming (straw etc), residues from the forestry industry (first thinning products), forestry economy products, dedicated culture (short rotation coppice), residues from the agroalimentary industry, household organic waste, waste from wood transformation facilities, waste wood from the construction industry and paper, recycled or not.

The lignocellulose biomass may also derive from by-products of the papermaking industry such as Kraft lignin, or black liquor derived from the manufacture of paper pulp.

All of the products or mixture of products derived from the thermochemical conversion of biomass or algae, such as wood charcoal or oil from the pyrolysis of lignocellulosic biomass, pyrolytic lignin (obtained by extraction of pyrolysis oil) or products from the hydrothermal conversion of lignocellulose biomass in the presence of high concentrations of water and under high water pressure under subcritical or supercritical water conditions and in the presence or absence of catalysts also constitute suitable feeds.

Other co-feeds are algae (micro- and macroalgae) as well as activated sludges from water treatment stations.

Before liquefaction, the coal may undergo one or more pre-treatment stages. The coal optionally undergoes a pre-treatment reducing its ash content. With or without ash reduction pre-treatment, the coal preferably undergoes a pre-treatment to reduce its moisture content, followed by a stage for reducing the particle size until the size range which is suitable for forming the coal/solvent suspension for treatment in the conversion process is reached.

Known techniques for reducing ash content are washes, extractions, and physical and mechanical separations. The washes and extractions may be carried out using water, aqueous solutions which may be acidic or basic, organic products, possibly derived from a liquefaction process, or mixtures of water and organic products. These washes or extractions are generally associated with physical and/or mechanical separations which exploit the difference in the flotation capacity of coal particles and of ash, or the difference in density between coal and ash which are principally minerals which are heavier than the coal. These techniques may necessitate prior grinding and operations at different temperatures by means of heating and/or cooling methods.

Examples of known techniques for drying are the rotary furnace, moving bed, fluidized bed, heated worm, and contacting with metal heat-carrying beads. These techniques may also use a gas circulating as a co- or counter-current such as nitrogen or any other gas which is inert under the reaction conditions. The drying stage is carried out at a temperature of less than 250° C., preferably less than 200° C., more preferably for 15 to 200 minutes.

The dry coal is then sent to a grinder which can produce the granulometry desired for its liquefaction. Grinding prior to liquefaction facilitates transport to the reaction zone and enhances gas/liquid/solid contacts.

The stages for reducing the ash and/or drying and/or grinding may be operated in a decentralized mode close to the coal production and/or in a centralized mode supplying the liquefaction directly.

After the pre-treatment, coal particles are obtained with a moisture content of 1% to 50%, preferably 1% to 35% and more preferably 1% to 10%, as well as a particle size of less than 600 microns, preferably less than 150 microns.

Liquefaction

In the present invention, coal is liquefied by a catalytic hydroconversion process in two successive ebullated bed type reactors.

After any pre-treatment stages as described above, the coal is mixed with a solvent, preferably a hydrogen donor solvent comprising tetralin and/or naphtheno-aromatic molecules, for example. Advantageously, the solvent comprises a vacuum distillate, preferably vacuum gas oil (VGO). Said solvent is preferably a recycled cut derived from a separation stage carried out after the two liquefaction stages, possibly supplemented with the heavy fraction derived from atmospheric distillation after the hydrocracking stage, said solvent being recycled upstream of the two liquefaction stages and advantageously containing a vacuum gas oil type cut.

The coal/solvent mixture is a suspension of coal particles dispersed in said solvent; said suspension of solid fine particles in a liquid is also sometimes known as a slurry. For simplicity, the term "suspension" will be used below. In order to constitute the suspension, the coal particle size is less than 5 mm, preferably less than 1 mm, preferably less than 600 microns and more preferably less than 150 microns. The solvent/coal weight ratio is generally 0.1 to 3, preferably 0.5 to 2.

The solvent has a three-fold role: taking the feed into suspension in a slurry upstream of the reaction zone, thus enabling it to be transported to it, then partial dissolution of the primary conversion products and transfer of hydrogen to those primary products to allow conversion to liquid, thereby minimizing the quantity of solids and gas formed in said reaction zone. This hydrogen transfer thus represents a supplemental source of hydrogen for the unavoidable requirement for hydrogen in the transformation of coal into fuels.

Advantageously, the vacuum distillate fraction, preferably vacuum gas oil (VGO), is recycled either entirely or in part to the suspension preparation stage. Because all or part of the VGO derived from the vacuum distillation stage is recycled as a solvent after the liquefaction stages, the yield of desired fuel bases (diesel, kerosene, naphtha, etc) can be enhanced. Apart from acting as a solvent, the recycled portion of the VGO cut also represents the starting material for the hydrocracking reactions in the two liquefaction reactors.

Another source of solvent for the preparation of the suspension is an oil extract derived from solvent extraction of a vacuum residue and/or optionally an atmospheric residue, obtained by distillation of the effluent from liquefaction and/or hydrocracking. The solvent is preferably an aromatic and/or naphtheno-aromatic solvent and/or a polar solvent and/or a paraffinic solvent. Examples of aromatic solvents that may be used are toluene, xylenes, BTX mixtures, or a mixture of such solvents, phenol, cresols or their methylated derivatives, or a di-aromatic solvent such as alpha-methylnaphthalene, but also aromatics-rich cuts such as LCO, HCO, aromatic extracts or GO or heavy GO cuts, mixed or not in equal or different proportions. It may derive directly from the process or from any other refining process, such as fluidized bed catalytic cracking (LCO/HCO type solvent) or units for extracting aromatics from lubricant base production lines. Examples of naphtheno-aromatic solvents that may be used are tetralin, indane, indene or a mixture of these solvents, as well as GO or heavy GO cuts derived from the process or from any other refining process, mixed or not in equal or different proportions. Examples of polar solvents which may be used are furfural, NMP (N-methyl-2-pyrrolidone), sulpholane, DMF (dimethylformamide), quinoline, THF (tetrahydrofuran), or a mixture of said solvents in equal or different proportions. Examples of paraffinic solvents which may be used are propane, butane, pentane, hexane and heptane or a mixture of said solvents in equal or different proportions.

Another source of solvent for the preparation of the suspension is all or a portion of the residual fraction derived from atmospheric distillation after the hydrocracking stage. Clearly, it is also possible to use a mixture of the various solvents (VGO, oil extract, atmospheric residue, etc) cited above, in equal or different proportions.

The suspension is then introduced into the bottom of the liquefaction reactor containing an ebullated bed operating in liquid and gas upflow mode and containing at least one supported hydroconversion catalyst. The addition of hydrogen necessary for operation may be carried out by makeup hydrogen and/or with recycled hydrogen from the process and/or from another nearby refining process.

During coal liquefaction, the reactions in the reactor or reactors are as follows:

deoxygenation reactions, which can be broken down into:
  the decarbonylation reaction, which represents the set of reactions that can remove an oxygen atom and a carbon atom of a carboxyl group to form carbon monoxide (CO);
  the decarboxylation reaction, which represents the set of reactions which can remove a carboxyl group from a carboxylic group, thereby forming carbon dioxide ($CO_2$);
  the hydrodeoxygenation reaction (HDO), which corresponds to reactions which can remove oxygen from the feed and result in the formation of water in the presence of hydrogen;
the hydrodesulphurization reaction (HDS), which designates the reactions that can remove sulphur from the feed with the production of $H_2S$;
the hydrodenitrogenation reaction (HDN), which designates the reactions that can remove nitrogen from the feed with the production of $NH_3$;
the hydrogenation of unsaturated bonds and/or aromatic nuclei (HDol, HDA);
more generally, all hydrotreatment reactions (HDT);
hydrocracking reactions which result in opening of the naphthene ring or fractionation of paraffins into several lower molecular weight fragments (HCK);

thermal cracking and polycondensation reactions (coke formation), although these are unwanted;
water gas shift conversion reactions: $CO+H_2O \rightarrow CO_2+H_2$;
methanation reactions: $CO+3H_2 \rightarrow CH_4+H_2O$.

All of the reactions using hydrogen can be based on molecular hydrogen such as hydrogen atom transfer reactions between the hydrogen donor solvent or the conversion products (since the donor solvent may originate from certain families of recycled conversion products) and reagents.

The function of an ebullated bed catalytic reactor, including recycling the liquids from the reactor to the top through a stirred catalyst bed, is generally well known. Ebullated bed techniques use supported catalysts, generally in the form of extrudates the diameter of which is generally of the order of 1 mm or less than 1 mm, for example 0.7 mm or more. The catalysts remain in the reactors and are not evacuated with the products. The catalytic activity may be kept constant by in-line replacement (addition or removal) of the catalyst. Thus, it is not necessary to shut down the unit to change the spent catalyst, nor is it necessary to increase the reaction temperatures throughout the cycle in order to compensate for deactivation. Furthermore, the fact that it is possible to operate under constant operating conditions means that constant yields and qualities of the products can be obtained throughout the cycle. In addition, because agitation of the catalyst is maintained by recycling a lot of the liquid, the pressure drop through the reactor remains small and constant, and the heat of reaction is rapidly distributed through the catalytic bed which is thus virtually isothermal and does not need the injection of quenches. Carrying out ebullated bed hydroliquefaction means that problems with contamination of the catalyst linked to the deposition of impurities naturally present in the coal can be avoided. The ebullated bed can also allow a quasi-isothermal operation, which is an advantage for highly exothermic reactions such as hydrocracking.

Ebullated bed technology also means that coal conversion can be carried out by co-treatment with other feeds such as those described above, said feeds frequently being considered to be waste.

The fact that two ebullated bed reactors are used means that it is possible to improve operability as regards the flexibility of the operating conditions and the catalytic system. The various possibilities for treatment of the spent catalysts described below by regeneration and/or rejuvenation and/or cascading means that the service life of the catalysts can be increased, as well as the cycle times for the whole of the process.

Normally, a pressure of 15 to 25 MPa is used, preferably 16 to 20 MPa, at a temperature of approximately 300° C. to 440° C., preferably in the range 325° C. to 420° C. for the first reactor and in the range 350° C. to 470° C., preferably in the range 350° C. to 450° C. for the second reactor. The mass velocity per hour is in the range 0.1 to 5 $h^{-1}$ and the quantity of hydrogen mixed with the feed (coal and any other co-feed(s)) is normally approximately 0.1 to 5 normal cubic meters ($Nm^3$) per kg of feed, preferably approximately 0.1 to 3 $Nm^3$/kg and usually approximately 0.1 to approximately 2 $Nm^3$/kg in each reactor. After the first stage, the conversion of the feed is in the range 30% to 100%, preferably in the range 50% to 99%, the conversion possibly being defined with respect to the THF-insolubles, for example. The dry coal conversion is then all of that which is insoluble in THF.

The suspension is introduced into the first reactor which is maintained under selected temperature and pressure conditions and in the presence of particles of a hydroconversion catalyst. The temperature of the reactor in said first hydroconversion stage is lower than that of the second hydroconversion stage. The choice of operating conditions, and in particular the choice of a temperature in the range 300° C. to 440° C., preferably in the range 325° C. to 420° C., allows hydrogenation and liquefaction of the coal with a very high degree of conversion and simultaneously allows hydrogenation of the solvent to be carried out. The moderate temperature limits thermal cracking, resulting in the formation of unwanted gas and limits the condensation of aromatic rings leading to the unwanted formation of coke. This minimizes deactivation of the catalyst and substantially extends the effective catalyst service life.

At least a portion of the effluent derived from the first liquefaction stage is then injected into a second liquefaction reactor containing a supported ebullated bed catalyst functioning in liquid and gas upflow mode and containing at least one hydroconversion catalyst. The effluent is mixed with supplemental hydrogen which may be makeup hydrogen and/or recycled from the liquefaction process and/or from another nearby refining process. This reactor, which functions in a manner similar to the reactor in stage b), is used at a temperature at least approximately 10° C. higher than that of the reactor in stage b). The increase in the temperature in the second reactor may be accomplished by adding hot hydrogen (fresh or recycled). In general, the operating temperature is approximately 350° C. to 470° C., preferably 350° C. to 450° C. The pressure in the reactor of stage c) is 0.1 to 1 MPa lower than in the reactor of stage b) in order to allow at least a portion of the effluent from stage b) to flow without requiring pumping. The catalyst used in stage c) may be identical to that in stage b).

In the reactor of stage c), the temperature which is higher than that in the first stage is selected in order to provide a catalytic and thermal conversion for the as yet unconverted coal that is more complete. Hydroconversion of the liquid products derived from the first stage and thermal conversion of coal into liquids are accentuated along with hydrocracking, hydrodeoxygenation, decarboxylation, decarbonylation, hydrodesulphurization and hydrodenitrogenation reactions. The operating conditions are selected in order to minimize the formation of gas or the formation of solids (generally known as coke).

The various operating conditions in terms of temperature in the two hydroconversion stages are selected in order to be able to control hydrogenation and the conversion of coal into the desired products in each reactor and to simultaneously convert the coal, the recycled solvent and the liquids derived from the coal during the hydroliquefaction. The various operating conditions thus allow the hydrogen utilization to be optimized. The lower temperature in the first liquefaction reactor limits the formation of coke and the polymerization reactions while favouring solvent hydrogenation. Hydrogenation of the solvent facilitates hydrogen transfer between the solvent and the coal and/or the conversion products throughout hydroconversion. The higher temperature in the second hydroconversion reactor means that the as yet unconverted coal can be converted.

Optionally, the effluent obtained at the end of the first liquefaction stage undergoes separation of the light fraction and at least a portion, preferably all of the residual effluent is treated in the second hydroconversion stage. This separation is advantageously carried out in an inter-stage separator. The light fraction contains mainly compounds boiling at more than 300° C., or even more than 450° C. This separation avoids overcracking of the light fraction in stage c). It can also reduce the costs for the reactor of stage c) (less feed to be treated, less catalyst) or can bring an external feed to the reactor of stage c) or increase the residence time in the reactor of stage c). The hydrogen of the light fraction which is separated out may be recycled to the process after purification. In order to improve separation of the light fraction, the bottom product from the inter-stage separator containing mainly the heavy fraction and optionally a portion of the light fraction may be treated in a vacuum distillation stage or liquid/liquid extraction stage or high pressure stripping stage, for example with hydrogen.

Although liquefaction in two liquefaction stages produces high fuel base yields, a third ebullated bed liquefaction reactor operating at a higher temperature than that of the second reactor may be foreseen for certain coal feeds or coal/co-feed mixtures. In this case, the temperature of the third reactor is at least 10° C. higher than that of the second reactor. The possibility of an inter-stage separation of the effluent gases upstream of said third reactor applies in the same manner.

The catalysts used for coal liquefaction are preferably catalysts known for the hydroconversion of oil industry residues. The term "hydroconversion" means hydrotreatment and/or hydrocracking reactions. In the two hydroliquefaction stages, it is possible to use any conventional catalyst for the hydrotreatment and/or hydroconversion of high molecular weight feeds, in particular a granular catalyst comprising, on a support, at least one metal or compound of a metal having a hydrodehydrogenating function.

This catalyst is advantageously a catalyst comprising at least one metal from group VIII, generally selected from the group formed by nickel and/or cobalt, optionally at least one metal from group VIB, preferably molybdenum and/or tungsten. As an example, a catalyst can be used comprising 0.5% to 10% by weight of nickel, preferably 1% to 5% by weight of nickel (expressed as nickel oxide, NiO) and 1% to 30% by weight of molybdenum, preferably 5% to 20% by weight of molybdenum (expressed as molybdenum oxide, $MoO_3$) on a mineral support. This support is, for example, selected from the group formed by alumina, silica, silica-aluminas, magnesia, clays and mixtures of at least two of these minerals. Advantageously, this support comprises other doping compounds, especially oxides selected from the group formed by boron oxide, zirconia, cerine, titanium oxide, phosphoric anhydride and a mixture of said oxides. Usually, an alumina support is used, and more usually an alumina support doped with phosphorus or possibly boron. The concentration of phosphoric anhydride, $P_2O_5$, is normally in the range 0 or 0.1% to approximately 10% by weight. The concentration of boron trioxide, $B_2O_3$, is normally in the range 0 or 0.1% to approximately 10% by weight. The alumina used is normally a γ or η alumina. This catalyst is usually in the form of extrudates. The total quantity of oxides of metals from groups VIB and VIII is usually approximately 5% to approximately 40% by weight and in general approximately 7% to 30% by weight, and the weight ratio, expressed as the metal oxide, between the metal (or metals) from group VIB and the metal (or metals) from group VIII is generally approximately 20 to approximately 1 and usually approximately 10 to approximately 2.

The catalysts for the liquefaction stages of the present invention may be identical or different in the reactors. Preferably, the catalysts used are based on cobalt-molybdenum or nickel-molybdenum on alumina.

Prior to injecting the feed, the catalysts used in the process of the present invention preferably undergo a sulphurization treatment in order to transform at least a portion of the metallic species into sulphide before bringing them into contact with the feed to be treated. This treatment for activation by sulphurization is well known to the skilled person and may be carried out using any method which has been described in the literature, either in situ, i.e. in the reactor, or ex situ.

Each of the ebullated bed reactors comprises at least one means for withdrawing catalyst from said reactor located near to the bottom of the reactor and at least one means for adding fresh catalyst to said reactor located close to the top of said reactor. Adding fresh catalyst and withdrawing catalyst may optionally be carried out using the same pipework as long as these two actions are not simultaneous.

The spent catalyst is partially replaced with fresh catalyst (new or regenerated) by withdrawal from the bottom of the reactor and introducing fresh catalyst into the top of the reactor at regular time intervals, i.e., for example in batches or in a quasi-continuous manner. As an example, fresh catalyst may be introduced every day. The rate at which spent catalyst is replaced with fresh catalyst may, for example, be approximately 0.05 kilogram to approximately 10 kilogram per tonne of feed. This withdrawal and replacement are carried out by means of devices which allow this hydroconversion stage to function continuously. The unit normally includes one recirculating pump per reactor, meaning that the catalyst can be maintained in an ebullated bed by continuously recycling at least a portion of the liquid withdrawn from the upper portion of the reactor and re-injected into the bottom of the reactor. It is also possible to send spent catalyst withdrawn from the reactor to a regeneration zone in which the carbon and sulphur which it includes is removed, then to return the regenerated catalyst to the first or second or to the third stage of the hydroconversion, possibly as a complement to fresh catalyst. It is also possible to send the spent catalyst withdrawn from the reactor to a rejuvenation zone in which at least a portion of the deposited metals is eliminated before regenerating the catalyst by eliminating the carbon and sulphur it includes and returning the rejuvenated and regenerated catalyst to the first or to the second or to the third hydroconversion stage, optionally supplemented with fresh catalyst. The rejuvenation or regeneration stage may optionally be preceded by a stripping stage for elimination of at least a portion of the hydrocarbons withdrawn with the catalyst. The regeneration stage may optionally be followed by sulphurization before being sent to the first, to the second or to the third hydroconversion stage.

It is also possible to transfer all or a portion of the spent catalyst withdrawn from the reactor of stage b), operating at a lower temperature, directly to the reactor of stage c) operating at a higher temperature, or to transfer all or part of the spent catalyst withdrawn from the reactor for stage c) directly to the reactor for stage b). It has been shown in the absence of co-treatment that the catalyst is deactivated less in the reactor operating at the lower temperature than in the reactor operating at a higher temperature, apparently because of the lower operating temperatures. However, in the case of a particular co-treatment where the feed or feeds added to stage b) in addition to the coal type feed introduced into stage b) may induce more rapid deactivation of the catalyst in stage b) operating at a lower temperature, a transfer of all or a portion of the spent catalyst withdrawn from the reactor for stage c), operating at a higher temperature, may be carried out directly to the reactor for stage b). This catalyst cascade system can prolong the service life of the catalyst. This principle can be extrapolated to the case of three reactors used in series. The use of this catalyst cascade principle enables better hydrogenation and liquefaction of coal per tonne of fresh catalyst used or a reduction in the quantity of fresh catalyst necessary for each tonne of coal to be obtained. In the case of cascading, the catalyst for the first and second reactor, or even the third reactor, is identical. The stages for stripping and/or rejuvenation and/or regeneration and/or sulphurization of the withdrawn catalyst may optionally be integrated into the system for cascading the catalyst between two hydroconversion reactors.

Intermediate Separation, with or without Decompression

The effluent obtained at the end of the second liquefaction stage undergoes at least one separation stage d), optionally supplemented with other supplementary separation stages in accordance with different embodiments.

Separation after the liquefaction stages is generally carried out as follows. The effluent obtained at the end of stage c) is separated (generally in a high pressure high temperature, HPHT, reactor) into a fraction termed the light fraction which contains the vast majority (at least 90% by volume) of compounds boiling at at most 200° C., or at most 300° C., or at most 500° C.; they primarily correspond to compounds present in the gas, namely naphtha, kerosene, diesel. The other fraction is termed the residual fraction. Note that the cut primarily contains these compounds as separation is not carried out at a precise cut point; it is more precisely a flash. If it is necessary to refer to cut points, it could be said to be in the range 100° C. to 300° C. or 200° C. to 450° C.

In a first embodiment, the effluent from the second liquefaction stage undergoes a stage for separation with decompression, i.e. with decompression between the liquefaction and hydrocracking. This configuration may be qualified as a non-integrated layout. The "light" fraction from the separation stage d) undergoes supplemental separation stages with decompression before the atmospheric distillate from these stages is sent to the hydrocracking stage.

In a second embodiment, the effluent from the second liquefaction stage undergoes separation without decompression, i.e. without decompression between the liquefaction and the hydrocracking stage. This configuration may qualify as an integrated layout. The "light" fraction from the separation stage d) is then sent directly to the hydrocracking stage.

Intermediate Separation with Decompression (Non-Integrated Layout)

In accordance with the non-integrated layout, the separation stage can separate a gas phase, at least one light liquid hydrocarbon fraction of the naphtha, kerosene and/or diesel type, a vacuum gas oil fraction, a vacuum residue fraction and a solid fraction which may be a vacuum residue.

The separation stage may advantageously be carried out using any method known to the skilled person, such as a combination of one or more high and/or low pressure separators, and/or stages for high and/or low pressure distillation and/or stripping, and/or liquid/liquid extraction stages, and/or solid/liquid separation stages and/or centrifuging stages.

Preferably, the separation is carried out in a fractionation section which comprises a high pressure high temperature (HPHT) separator and optionally a high pressure low temperature (HPLT) separator and/or an atmospheric distillation and/or a vacuum distillation and/or solvent extraction. Preferably, the "light" fraction obtained at the end of the separation of stage d), preferably carried out by a HPHT separator, is fractionated by atmospheric distillation into an atmospheric distillate fraction and an atmospheric residue fraction. The atmospheric residue fraction may be fractionated by vacuum distillation into a vacuum distillate fraction containing vacuum gas oil and a vacuum residue fraction. The atmospheric residue fraction and/or the vacuum residue fraction may undergo solvent extraction in order to obtain an oil extract and an insoluble fraction. Said vacuum distillate fraction containing gas oil and/or oil extract is (are) recycled in part or as a whole as a solvent to stage a) and said atmospheric distillation fraction is sent to the hydrocracking stage, possibly mixed with other co-feeds.

Advantageously, the effluent from the stage for liquefaction in accordance with the invention initially undergoes a gas/liquid separation stage. Preferably, the effluent from the second liquefaction reactor is separated in a high pressure high temperature separator (HPHT) from which a vapour phase, termed the light fraction, and a liquid phase, termed the residual fraction, are recovered. The vapour phase may be sent to a high pressure low temperature (HPLT) separator via heat exchange equipment from which a vapour phase containing gases ($H_2$, $H_2S$, $NH_3$, $H_2O$, $CO_2$, CO, C1-C4 hydrocarbons, etc) and a liquid phase are recovered. The high pressure low temperature (HPLT) separator may also treat the vapour phase derived from the inter-stage separator (ISS) via heat exchange equipment which may be common to that treating the vapour phase from the HPHT separator.

The liquid phase from the high pressure low temperature (HPLT) separator is advantageously depressurized in one or two low pressure low temperature (LPLT) separators so that it is at least partially degassed. An intermediate depressurization stage in a medium pressure low temperature (MPLT) separator may also be foreseen.

Alternatively, the fraction(s) from the HPHT and/or HPLT and/or MPLT and/or LPLT separator(s) may be treated in liquid/solid and/or liquid/liquid extraction and/or precipitation and/or liquid/solid separation stages.

The gases extracted from the HPLT separator undergo a purification treatment in order to recover hydrogen and recycle it to the liquefaction reactors. It is also possible to add the gas phase from the inter-stage separator.

The liquid phases originating from the HPHT, HPLT and optionally MPLT and LPLT separators are advantageously sent to the fractionation system. The fractionation system comprises an atmospheric distillation system possibly followed by a vacuum distillation, solvent extraction, filtration and/or centrifuging system. Preferably, the fractionation system comprises an atmospheric distillation system followed by a vacuum distillation system to produce a gaseous effluent, an atmospheric distillate fraction and in particular containing naphtha, kerosene and diesel, a vacuum distillate fraction containing vacuum gas oil (VGO) and a vacuum residue (VR) fraction.

The fraction termed the light fraction from the atmospheric distillation stage and containing naphtha, kerosene and diesel in particular, possibly supplemented with a portion of the heavy VGO fraction and/or other co-feeds, are sent to the hydrocracking reactor after heating and mixing with supplementary hydrogen.

The following may be used as co-feeds: vacuum distillates of oil origin, deasphalted oils, resins from deasphalting, derivatives from oil conversion processes (such as: LCO, HCO, heavy GO/VGO from coking, etc), aromatic extracts derived from production lines for lubricant bases, or mixtures of such feeds, effluents from the Fischer-Tropsch synthesis carried out using synthesis gas produced by gasification of oil type feeds, non-oil (coal, gas) or renewable (biomass), oils and fats of vegetable origin (for example rape, sunflower, soya, palm, palm nut, olive, coconut, jatropha, etc) or animal (such as lard or fats composed of residues from the food industry or from the restaurant industry), algae or fish oils, or any products or mixtures of products, unrefined or pretreated, derived from the thermochemical conversion of biomass, such as oil from the pyrolysis oil of lignocellulose biomass, pyrolytic lignin (obtained by extraction of pyrolysis oil) or products from the hydrothermal conversion of lignocellulose biomass in the presence of a large concentration of water and at high water pressure under subcritical or supercritical conditions for the water and in the presence or absence of catalysts.

All or a portion of the heavy vacuum gas oil hydrocarbon fraction (VGO) may be recycled upstream of the liquefaction to form the suspension with the pre-treated coal. Recycling this phase can increase the conversion of the coal into fuel bases. Recycling this phase, acting as a hydrogen donor solvent, can also provide a portion of the hydrogen necessary for hydroliquefaction.

A portion of the heavy vacuum gas oil fraction (VGO) may also be mixed with the light fraction derived from atmospheric distillation (and containing naphtha, kerosene and diesel in particular) for its subsequent treatment in the hydrocracking reactor. The VGO-rich cut may also act as a base for heavy fuel oils or bunker fuel or be sent to other refining units such as hydrocracking or catalytic cracking units. The VGO-rich cut may also be gasified with a view to producing hydrogen.

For the vacuum distillation residue (VR), the cut point is generally selected such that the initial boiling point of the heavy fraction is approximately 450° C. to approximately 550° C. This heavy fraction is a solid which can then be burned or can be supplied to a gasification unit in order to produce hydrogen and energy. The hydrogen produced thereby may be introduced into the hydroliquefaction process.

The vacuum residue (VR) fraction withdrawn from the bottom of the vacuum distillation and/or recovered during solid/liquid extraction and/or liquid/liquid extraction and/or precipitation and/or liquid/solid separation and/or centrifuging may be constituted by unconverted feed(s), and solids produced by unwanted reactions such as coke, inorganic solids present as impurities or deriving from fines produced by attrition of the catalyst. These solids may be re-treated, dump stored or upgraded by undergoing various chemical and/or thermal treatments such as gasification with a view to producing hydrogen or incineration. They may also act as solid fuels, for example in a cement furnace or to produce on-site energy.

The vacuum residue fraction (VR) and possibly the atmospheric residue fraction may undergo a stage for extraction by a solvent of the aromatic, naphtheno-aromatic, polar and/or paraffinic type such as that described in the liquefaction section. The oil extracted thereby may act as a recycling solvent for the preparation of the suspension with the coal.

It is important to emphasize that the liquefaction of coal, whether it is direct or indirect, is above all a problem of hydrogen content. The composition of coal, which is low in hydrogen, means that fuel bases cannot be obtained without a massive addition of hydrogen; the hydrogen necessary for the reaction is generally supplied from steam reformed natural gas. The economic advantages of coal liquefaction are thus considerable. An industrial unit costs several million Euros. Reducing the costs, especially by adjusting and optimizing hydrogen management, is one of the principal thrusts of advance in this sector.

The present invention aims to produce excellent products while optimizing hydrogen management and the operating pressure of hydrocracking and liquefaction units. Adjusting the operating conditions, the feed to be treated and the desired products means that various possibilities for injecting and recycling hydrogen can be foreseen.

These various implementations can be foreseen by virtue of the stage for separation with intermediate decompression (non-integrated layout) between liquefaction and hydrocracking. This separation stage means that two independent hydrogen circuits can be provided, one connected to liquefaction, the other to hydrocracking and which, as required, may be connected to each other. The fact that the two hydrogen circuits can be connected means that the hydrogen management can be optimized and costs can be limited in terms of compressors and/or gaseous effluent purification units.

The various implementations for hydrogen management are thus:
  option A: hydrogen is added using two independent hydrogen circuits;
  option B: makeup hydrogen is added in the hydrocracking stage, the pressure in the hydrocracking stage being higher than the pressure in the liquefaction stages, the hydrogen recycled to the hydrocracking stage being recycled to the liquefaction stages;
  option C: makeup hydrogen is added in the hydrocracking stage, the pressure in the hydrocracking stage being equivalent to the pressure in the liquefaction stages, the hydrogen recycled to the hydrocracking stage being recycled to the liquefaction stages;
  option D: makeup hydrogen is added in the hydrocracking stage, optionally supplemented by a makeup of hydrogen added in the liquefaction stages, the pressure in the hydrocracking stage being lower than the pressure in the liquefaction steps, the hydrogen recycled from the hydrocracking stage being recycled to the liquefaction stages.

In the present invention, the term "makeup hydrogen" is used to distinguish it from recycled hydrogen. The purity of the hydrogen is generally in the range 84% to 100%, preferably in the range 95% to 100%.

In option A, the hydrogen management is based on two independent cycles: makeup hydrogen is injected separately into the two types of units (liquefaction and hydrocracking), and after its passage through the reactors, the hydrogen contained in the gaseous effluent from liquefaction or hydrocracking is recycled in two independent circuits each including a hydrogen purification unit and a compressor. On each type of unit (liquefaction and hydrocracking), the operating conditions may be adjusted practically separately, which provides great operational flexibility.

In implementations B, C and D, the two hydrogen circuits are interconnected by a single recycling system. Makeup hydrogen is generally injected into the hydrocracking unit. The hydrogen moves through the hydrocracking reactor, then through the liquefaction reactor or reactors. A single common recycling system with, depending on the pressure difference in the units, one or two hydrogen purification units and/or one or two compressors connect the two units, liquefaction and hydrocracking. This type of hydrogen injection necessitates common management of the operating pressures of the two units in order to ensure that the two units have a suitable hydrogen quantity and pressure for the desired reactions.

In general, the hydrocracking stage of the invention may advantageously be carried out in one or more fixed bed catalytic beds, in one or more reactors. For simplicity, the term "hydrocracking reactor" will also include the possibility that there might be several.

In option B, all of the makeup hydrogen is injected into the hydrocracking reactor, the pressure in the hydrocracking reactor being higher than the pressure in the liquefaction reactors. After passing into the hydrocracking reactor, the hydrogen is optionally purified in a first purification unit, then injected directly, i.e. without supplemental compression, and after optional reheating, into the two liquefaction reactors. The hydrogen leaving the liquefaction reactors is purified in a second purification unit, compressed and recycled to the liquefaction reactors. The liquefaction reactors are then entirely supplied with recycled hydrogen, originating either from hydrocracking or from liquefaction. This process means that a higher partial pressure of hydrogen can be used in the hydrocracking stage without increasing the pressure of the liquefaction units. Further, pressurization of the hydrogen leaving the hydrocracking stage is not necessary because of the higher pressure in this unit. Compared with the process with two independent circuits (option A), this process has the advantage of necessitating a single compressor instead of two.

In option C, all of the makeup hydrogen is injected into the hydrocracking reactor, the pressure in the hydrocracking reactor being equivalent to the pressure in the liquefaction reactors. After passing through the hydrocracking reactor, the hydrogen is supplied directly to the single purification unit purifying recycled hydrogen originating from the liquefaction reactors and the hydrocracking unit. The hydrogen is then compressed and injected, after optional reheating, into the two liquefaction reactors. The hydrogen leaving the liquefaction reactors is purified in the purification unit also purifying the hydrogen originating from the hydrocracking, then recycled to the liquefaction reactors. The liquefaction reactors are then entirely supplied with recycled hydrogen originating from hydrocracking and liquefaction. This process has the advantage of necessitating a common single compressor and single purification unit.

In option D, makeup hydrogen is injected into the hydrocracking reactor, the pressure in the reactor being lower than the pressure in the liquefaction reactors. After passing through the hydrocracking reactor, the hydrogen is optionally supplied to a first purification unit. The hydrogen is then compressed in a first compressor, then injected into the two liquefaction reactors after optional reheating. If necessary, a supplemental makeup of hydrogen may be carried out in the two liquefaction reactors. The hydrogen leaving the liquefaction reactors is purified in a second purification unit, pressurized in a second compressor (or in the first compressor to a different level of compression) and recycled to the liquefaction reactors. In contrast to option A, hydrogen leaving the hydrocracking stage is not recycled to the hydrocracking reactor but is entirely recycled to the liquefaction reactors, which necessitates a higher pressure. Thus, hydrogen management is optimized.

Intermediate Separation Without Decompression (Integrated Layout)

In accordance with the non-integrated layout implementation including an intermediate separation without decompression between liquefaction and hydrocracking, the effluent derived from the liquefaction stage of the invention initially undergoes a stage for separation without decompression, preferably in a high pressure high temperature (HPHT) separator, from which a "light" fraction is recovered containing primarily (at least 90% by volume) compounds boiling at at most 200° C., or at most 300° C., or at most 500° C.; they mainly correspond to the compounds present in the gases, namely naphtha, kerosene and diesel. The other fraction is termed the residue fraction. It should be indicated that the cut contains these compounds in the vast majority, as separation is not carried out with a precise cut point but rather resembles a flash. If cut point terms must be used, then it could be said that it is in the range 100° C. to 300° C. or 200° C. to 450° C.

Said light fraction is sent directly to the hydrocracking unit without intermediate decompression. The residual fraction, after cooling, is vacuum distilled and/or solvent extracted to obtain a vacuum distillate containing a vacuum gas oil and/or an oil extract, all or at least a portion of said vacuum gas oil and/or said oil extract being recycled as the solvent to stage a) and/or optionally sent to the hydrocracking stage, mixed with the "light" fraction. The solvents which can be used for the extraction stage are aromatic, naphtheno-aromatic, polar and/or paraffinic type solvents such as those described in the liquefaction portion.

Separation in accordance with the integrated layout produces better thermal integration and results in savings in energy and equipment. Similarly, the layout has techno-economic advantages since the high pressure streams do not require the pressure to be increased for their subsequent hydrocracking. Because of its simplified intermediate fractionation, this implementation can also reduce the consumption of utilities and thus reduce costs.

Hydrocracking

The light fraction from atmospheric distillation using the non-integrated layout or derived from the HPHT separator using the integrated layout and containing naphtha, kerosene and diesel in particular, optionally supplemented with a portion of the heavy VGO fraction and/or another co-feed, is sent to the fixed bed hydrocracking reactor after heating and mixing with supplemental hydrogen.

The hydrocracking stage of the invention operates in the presence of hydrogen and a catalyst at a temperature of more than 200° C., preferably in the range 250° C. to 480° C., more preferably in the range 320° C. to 450° C., highly preferably in the range 330° C. to 435° C., at a pressure of more than 1 MPa, preferably in the range 2 to 25 MPa, more preferably in the range 3 to 20 MPa, at a space velocity in the range 0.1 to 20 $h^{-1}$, more preferably in the range 0.1 to 6 $h^{-1}$, preferably in the range 0.2 to 3 $h^{-1}$, and the quantity of hydrogen introduced is such that the volume ratio of hydrogen to hydrocarbons is in the range 80 to 5000 $Nm^3/m^3$, usually in the range 100 to 3000 $Nm^3/m^3$.

These operating conditions used in the process of the invention can generally be used to obtain conversions per pass into products with boiling points of less than 340° C., more preferably less than 370° C., of more than 10% by weight, more preferably in the range 20% to 100% by weight.

The term "hydrocracking" means hydrocracking reactions accompanied by hydrotreatment reactions (hydrodenitrogenation, hydrodesulphurization), hydroisomerization, hydrogenation of aromatics and naphthene ring opening reactions.

The hydrocracking process generally comprises a first stage of hydrorefining to reduce the quantity of heteroatoms before hydrocracking. Conventional hydrorefining catalysts contain at least one amorphous refractory oxide support (usually alumina) and at least one hydrodehydrogenating element (generally at least one element from group VIB and non-noble group VIII, and usually at least one element from group VIB and at least one non-noble element from group VIII). Preferably, the hydrorefining catalyst is a catalyst optionally comprising a doping element selected from phosphorus, boron and silicon.

In hydrorefining, the feed is brought into contact in the presence of hydrogen with at least one catalyst as described above, at a temperature in the range 330° C. to 450° C., preferably 360° C. to 420° C., at a pressure in the range 5 to 25 MPa, preferably less than 20 MPa, the hourly space velocity being in the range 0.1 to 6 $h^{-1}$, preferably in the range 0.2 to 3 $h^{-1}$ and the quantity of hydrogen introduced is such that the volume ratio of hydrogen to hydrocarbons ($H_2$/HC ratio) is in the range 100 to 2000 $Nm^3/m^3$ of feed.

The hydrocracking stage of the invention may advantageously be carried out in one or more fixed catalytic beds in one or more reactors in a "once-through" hydrocracking layout with or without intermediate separation or in a two-stage hydrocracking layout, the once-through or two-stage schemes operating with or without liquid recycling of the unconverted fraction, optionally in association with a conventional hydrotreatment catalyst located upstream of the hydrocracking catalyst.

Once-through hydrocracking comprises, in the first place and in general, intense hydrorefining which is intended to carry out intense hydrodenitrogenation and desulphurization of the feed before it is sent over the hydrocracking catalyst proper. This intense hydrorefining of the feed involves only a limited conversion of the feed into lighter fractions, which remains insufficient and thus must be completed over the more active hydrocracking catalyst described above. However, it should be noted that no separation is included between the two types of catalysts. All of the effluent from the reactor outlet or from the catalytic bed is injected onto said hydrocracking catalyst proper and only then is a separation of the products formed carried out. This version of hydrocracking, once-through hydrocracking, has a variation which involves recycling the unconverted fraction to the reactor with a view to more intense conversion of the feed.

The hydrocracking process of the invention may advantageously be used in a process known as a once-through fixed bed process with intermediate separation. Said process advantageously comprises a hydrorefining zone, a zone allowing partial elimination of ammonia from the effluent leaving the first zone, for example by a hot flash, and a hydrocracking zone in which at least a portion of the effluent from the first reaction zone is hydrocracked. The hydrocracking carried out in the second reaction zone is advantageously carried out in the presence of ammonia in a quantity smaller than the quantity present in the feed, preferably less than 1500 ppm by weight, more preferably less than 1000 ppm by weight and still more preferably less than 800 ppm by weight of nitrogen.

Two-stage hydrocracking advantageously comprises a first stage which is intended, as in the once-through process, to carry out hydrorefining of the feed but also to reach a conversion of this latter of the order of 40% to 60% in general. The effluent from the first hydrocracking stage then advantageously undergoes separation and preferably distillation, usually termed intermediate separation, which is intended to separate the conversion products from the unconverted fraction. In the second stage of a two-stage hydrocracking process, only the fraction of the feed which was not converted during the first hydrocracking stage is treated. The intermediate separation means that a two-stage hydrocracking process is more selective for middle distillates (kerosene+diesel) than a once-through process. In fact, intermediate separation of the conversion products prevents them from being "over-cracked" into naphtha and gas in the second stage over the hydrocracking catalyst. Furthermore, it should be noted that the unconverted fraction of the feed treated in the second stage generally contains very low quantities of $NH_3$ as well as of organic nitrogen-containing compounds, in general less than 20 ppm by weight or even less than 10 ppm by weight.

The first hydrorefining stage of hydrocracking processes known as once-through processes and hydrocracking processes termed two-stage processes may advantageously employ one or more hydrorefining catalysts in one or more different catalytic beds in order to carry out pre-converting refining in the case of the first hydrorefining stage of "two-stage" hydrocracking processes.

The hydrocracking catalysts used in the hydrocracking processes are all bifunctional in type, associating an acidic function with a hydrogenating function. The acid function is supplied by supports with surface areas generally varying from 150 to 800 $m^2/g$ and having a superficial acidity, such as halogenated aluminas (in particular chlorinated or fluorinated), combinations of boron oxides and aluminium, amorphous silica-aluminas and zeolites. The hydrogenating function is supplied either by one or more metals from group VIB of the periodic classification of the elements, or by an association of at least one metal from group VIB of the periodic classification of the elements and at least one metal from group VIII.

This catalyst may be a catalyst comprising metals from group VIII, for example nickel and/or cobalt, usually in association with at least one metal from group VIB, for example molybdenum and/or tungsten. As an example, it is possible to use a catalyst comprising 0.5% to 10% by weight of nickel (expressed as nickel oxide, NiO) and 1% to 30% by weight of molybdenum, preferably 5% to 25% by weight of molybdenum (expressed as molybdenum oxide, $MoO_3$) on an amorphous mineral support. The total quantity of oxides of metals from groups VI and VIII in the catalyst is generally in the range 5% to 40% by weight. The weight ratio (expressed on the basis of the metallic oxides) between the metal (metals) from group VI and metal (metals) from group VIII is generally approximately 20 to approximately 1, usually approximately 10 to approximately 2. In the case in which the catalyst comprises at least one metal from group VIB in combination with at least one non-noble metal from group VIII, said catalyst is preferably a sulphurized catalyst.

Advantageously, associations of the following metals are used: nickel-molybdenum, cobalt-molybdenum, nickel-tungsten, cobalt-tungsten, and more advantageously nickel-molybdenum and nickel-tungsten, still more preferably nickel-tungsten.

It is also possible to use associations of three metals, for example nickel-cobalt-molybdenum, nickel-molybdenum-tungsten, or nickel-cobalt-tungsten. It is also possible to use associations of four metals, for example nickel-cobalt-niobium-molybdenum.

As an example, the support can be selected from the group formed by alumina, silica, silica-aluminas, magnesia, clays and mixtures of at least two of these minerals. This support may also include other compounds, for example oxides selected form boron oxide, zirconia, titanium oxide and phosphoric anhydride. Usually, an alumina support is used, preferably η or γ alumina.

The catalyst may also contain a promoter element such as phosphorus and/or boron. This element may have been introduced into the matrix or, as is preferable, have been deposited on the support. Silicon may also be deposited on the support, alone or with the phosphorus and/or the boron. Preferably, the catalysts contain silicon deposited on a support such as alumina, optionally with phosphorus and/or boron deposited on the support, and also containing at least one metal from group VIII (Ni, Co) and at least one metal from group VIB (Mo, W). The concentration of said element is normally less than approximately 20% by weight (based on the oxide) and usually less than approximately 10%. The concentration of boron trioxide ($B_2O_3$) is normally approximately 0 to approximately 10% by weight.

Other conventional catalysts include Y zeolite with structure type FAU, an amorphous refractory oxide support (usually alumina) and at least one hydrodehydrogenating element (generally at least one element from groups VIB and VIII, and usually at least one element from group VIB and at least one element from group VIII).

Other catalysts are catalysts termed composite catalysts comprising at least one hydrodehydrogenating element selected from the group formed by elements from group VIB and from group VIII of the periodic classification of the elements and a support based on a silico-alumina matrix and based on at least one zeolite such as that described in application EP 1 711 260.

Preferably, the catalyst for the hydrocracking stage e) comprises at least one metal from group VIII selected from the group formed by Ni and/or Co and at least one metal from group VIB selected from the group Mo and/or W, on a support of the amorphous silica-alumina and/or zeolitic type.

Prior to injecting the feed, the catalysts used in the process of the present invention preferably undergo a sulphurization treatment that can transform at least a part of the metallic species into sulphide before being brought into contact with the feed to be treated. This treatment for activation by sulphurization is well known to the skilled person and may be carried out using any method already described in the literature either in situ, i.e. in the reactor, or ex situ.

Separation After Hydrocracking

The effluent obtained at the end of the hydrocracking stage preferably undergoes a separation stage allowing a gas phase, at least one light hydrocarbon fraction of the naphtha, kerosene and/or diesel type and a heavy residual fraction to be separated.

The separation stage may advantageously be carried out using any method known to the skilled person such as, for example, a combination of one or more high and/or low pressure separators, and/or distillation stages and/or high and/or low pressure stripping stages and/or liquid/liquid extraction stages, and/or solid/liquid separation stages and/or centrifuging stages.

Preferably, the separation is carried out in a fractionation section which may initially comprise a high pressure high temperature (HPHT) separator, and optionally a high pressure low temperature (HPLT) separator and/or atmospheric distillation.

Advantageously, the effluent from the hydrocracking stage in accordance with the invention initially undergoes a gas/liquid separation stage. Preferably, the hydrocracking effluent is separated in a high pressure high temperature (HPHT) separator from which a vapour phase and a liquid phase are recovered. The vapour phase may be sent to a high pressure low temperature (HPLT) separator via heat exchange equipment from which a vapour phase containing gases ($H_2$, $H_2S$, $NH_3$, $H_2O$, $CO_2$, CO, C1-C4 hydrocarbons, etc) and a liquid phase are recovered. The liquid phase from the high pressure low temperature (HPLT) separator is advantageously depressurized in one or two low pressure low temperature (LPLT) separators so as to be at least partially degassed. An intermediate depressurization step in a medium pressure low temperature (MPLT) separator may also be foreseen.

The gases extracted from the HPLT separator optionally undergo a purification treatment to recover the hydrogen and recycle it either to the hydrocracking reactor or to the liquefaction reactors.

The liquid phases from the HPHT, HPLT and optional MPLT and LPLT separators are advantageously sent to an atmospheric distillation stage to produce a gaseous effluent, fractions containing naphtha, kerosene and diesel in particular, and a residual fraction.

Optionally, the portion of the residual fraction, after extraction of the saturated portion with an aromatic, naphtheno-aromatic, polar and/or paraffinic solvent such as that described in the liquefaction portion, a process typically employed in lines for the production of bases for lubricants, may be recycled upstream of the liquefaction to form the suspension with the pretreated coal. This residual fraction essentially contains aromatic hydrocarbons and polycyclic aromatics (PAH). Because its chemical composition is close to that of coal, recycling this phase results in better solvolysis of the coal in the first reactor. Similarly, recycling the residual fraction can increase the net conversion into fuel bases of the coal because of the crackable molecules. Similarly, recycling this fraction can get rid of unwanted aromatic polycyclic hydrocarbons generally moving in a loop by recycling in the hydrocracking reactor. These aromatic polycyclic hydrocarbons are, inter alia, responsible for problems with deactivation of the hydrocracking catalyst by forming a coke precursor and of problems with clogging caused by them precipitating onto cold points, for example onto the exchanger at the hydrocracking outlet.

The products obtained may be integrated directly into fuel pools. This is often the case with the kerosene and gas oil fractions. If necessary, in particular after hydrocracking operated at moderate pressure (5 to 10 MPa), these latter may undergo further hydrotreatment or hydrocracking at high hydrogen pressure. The naphtha and VGO fraction(s) which generally cannot act as fuel bases, are generally subjected to one or more suitable treatments including, for naphtha: alkylation and/or isomerization and/or catalytic reforming, and for VGO: catalytic cracking or thermal cracking or the like. The aim of these post-treatments is to bring said products to the required specifications (sulphur content, smoke point, octane number, cetane number, etc) in a separate manner or mixed.

The good quality of the products obtained authorizes subsequent treatments under less severe conditions with good yields to obtain the product qualities required by commercial specifications at a lower processing and production cost.

The Products

The aim of the invention is to convert coal into bases for liquid fuels.

The direct liquefaction of coal conventionally produces fuel bases with a high naphtheno-aromatics content. This naphtheno-aromatics nature is responsible for a cetane number which is conventionally well below the specifications in force for a diesel cut or with a smoke point or a calorific power well below specifications for the kerosene cut, for example. On the one side, the high naphthenes content of the fuel bases derived from direct coal liquefaction can produce excellent cold properties.

The chemical composition of an oil diesel or kerosene cut is very different from the chemical composition of a diesel or kerosene cut obtained by direct coal liquefaction. An oil diesel or kerosene cut generally contains between 25% and 50% of paraffins, between 25% and 50% of naphthenes and between 10% to 30% of aromatics. A diesel or kerosene cut derived from direct coal liquefaction with no subsequent hydrocracking generally contains between 1% and 10% of paraffins, between 20% and 50% of naphthenes and between 35% and 70% of aromatics. Similarly, the percentage of mono-naphthenes compared with total naphthenes is generally in the range 60% to 70% in the case of oil fuel bases while it is generally 20% to 35% in the case of fuel bases derived from direct coal liquefaction.

Further, fuel bases derived from direct liquefaction with no subsequent hydrocracking are distinguished by high density, generally in the range 0.900 to 0.980 $g/cm^3$, which thus results in a low heat value (LHV) per unit volume substantially superior to that of fuel bases derived from oil (with a density in the range 0.800 to 0.850 $g/cm^3$) or fuel bases derived from indirect liquefaction using the Fischer-Tropsch process (with a density of 0.750 to 0.780 $g/cm^3$).

The concatenation of liquefaction and hydrocracking stages of the process can also produce fuel bases of a naphtheno-aromatic nature of excellent quality. In fact, the analyses carried out show that the properties are either close to or comply with Euro or US specifications for auto and aviation fuels, except as regards density. Surprisingly, the gas oil obtained by this process has an excellent cetane number which complies with European and American specifications despite a high naphthenes content. Similarly, the kerosene has a smoke point which complies with European and American specifications.

The term "excellent quality" means:
- a cetane number in the range 35 to 65, preferably in the range 40 to 55, for the diesel cut;
- a smoke point in the range 19 to 25 mm for the kerosene cut;
- a very high heat of combustion per unit volume, meaning that high energy density fuels can be manufactured.

The fuel bases obtained in accordance with the process, diesel or kerosene, generally contain in the range 1% to 30% by weight, preferably in the range 5% to 20% by weight of paraffins, in the range 65% to 100% by weight of naphthenes and in the range 0 to 30% by weight of aromatics and generally have a density in the range 0.84 to 0.90 g/cm$^3$.

The hydrocracking stage of the process of the invention can improve the cetane number, which is explained by a large reduction in the aromatics content, to the advantage of the naphthenes and paraffins obtained by cracking of the naphthenes. Similarly, the kerosene has a smoke point which complies with European and American specifications. These results are even more astonishing since fuel bases produced by direct coal liquefaction are conventionally known to be of poor quality not complying with specifications linked to combustion, because of their high naphtheno-aromatics content.

BRIEF DESCRIPTION OF FIGURES

The following Figures show advantageous implementations of the invention. Essentially, the facility and process of the invention will be described. The operating conditions described above will not be repeated.

FIG. 1 describes option A, using two independent hydrogen circuits.

FIG. 2 describes option B, using a pressure in the hydrocracking stage above that of the liquefaction stage.

FIG. 3 describes option C, using a pressure in the hydrocracking stage equivalent to that of the liquefaction stage.

FIG. 4 describes option D, using a pressure in the hydrocracking stage below that of the liquefaction stage.

Figure 1:
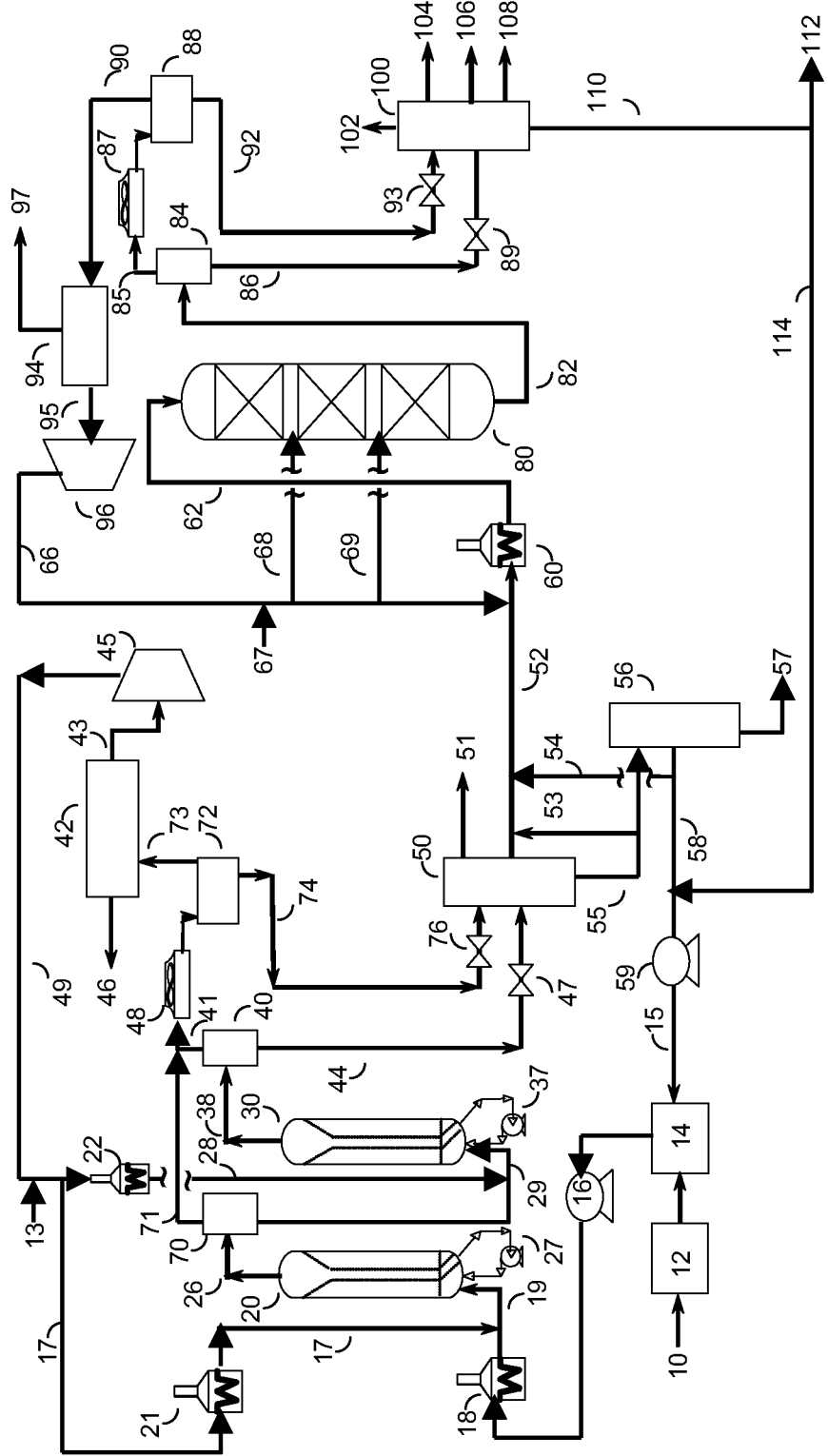
FIGS. 1 to 4 show the various implementations for hydrogen management in the non-integrated layout (intermediate separation with decompression).

The description of FIGS. 2 to 5 concentrates on the hydrogen management and its circuit in the process of the invention. Essentially, the differences in the facility and process will be described in comparison with option A of FIG. 1; the reference numerals regarding the units and circuit for the effluents are strictly identical to those of FIG. 1.

In FIG. 1 (option A), coal 10, preferably pre-treated and optionally pre-ground so as to facilitate the pre-treatment in order to reduce its moisture and ash content, is ground in the grinder 12 in order to produce particles with a suitable size in order to form a suspension and be more reactive under the liquefaction conditions. The coal is then brought into contact with the recycling solvent 15 derived from the process in the chamber 14 to form the suspension. If necessary, even though this is rare, a sulphur-containing compound may be injected (not shown) into the line leaving the chamber 14 in order to keep the metals of the catalyst in the sulphide form. The suspension is pressurized by the pump 16, pre heated in the chamber 18, mixed with recycled hydrogen 17 heated in the chamber 21, and introduced via the line 19 to the bottom of the first ebullated bed reactor 20 functioning in liquid and gas upflow mode and containing at least one hydroconversion catalyst. The reactor 20 normally includes a recirculating pump 27 to keep the catalyst in an ebullated bed by continuously recycling at least a portion of the liquid withdrawn from the upper portion of the reactor and re-injecting it into the bottom of the reactor. The hydrogen may also be introduced with the suspension into the furnace 18 thereby eliminating the chamber 21. The addition of hydrogen is supplemented with makeup hydrogen 13. Fresh catalyst may be added via the top of the reactor (not shown). Spent catalyst may be withdrawn from the bottom of the reactor (not shown) in order to be either eliminated or regenerated in order to eliminate the carbon and the sulphur and/or rejuvenated in order to eliminate the metals before re-injecting it via the top of the reactor. The partly spent catalyst withdrawn from the bottom of the first reactor may also be transferred directly into the top of the second hydroconversion reactor 30 (cascading) (not shown). This design may also be used in the case of three reactors in series.

Optionally, the converted effluent 26 deriving from the reactor 20 may undergo separation of the light fraction 71 in an inter-stage separator 70.

All or a portion of the effluent 26 from the first hydroconversion reactor 20 is advantageously mixed with supplemental hydrogen 28, if necessary already pre heated in the chamber 22. This mixture is then injected via the line 29 into a second ebullated bed hydroconversion reactor 30 functioning in liquid and gas upflow mode containing at least one hydroconversion catalyst. The operating conditions, in particular the temperature, in this reactor are selected in order to obtain the desired level of conversion, as has already been described. Any makeup of fresh catalyst may be carried out from the top of the reactor (not shown). The catalyst may be added periodically or continuously. The spent catalyst may be withdrawn from the bottom of the reactor (not shown) in order to be eliminated, or regenerated to eliminate carbon and sulphur, and/or rejuvenated to eliminate metals before re-injecting it via the top of the reactor. The reactor 30 normally comprises a re-circulating pump 37 which can keep the catalyst as an ebullated bed by continuously recycling at least a portion of the liquid withdrawn from the upper portion of the reactor and re injecting it into the bottom of the reactor. The effluent treated in the reactor 30 is sent via the line 38 to a high pressure high temperature (HPHT) separator 40 from which a vapour phase 41, said light fraction and a liquid phase 44 termed the residual fraction are recovered. The vapour phase 41 is sent, optionally as a mixture with the vapour phase 71 derived from the optional inter-stage separator 70 between the two liquefaction reactors, generally via an exchanger (not shown) or an air-cooled exchanger 48 for cooling, to a high pressure low temperature (HPLT) separator 72 from which a vapour phase 73 containing gases ($H_2$, $H_2S$, $NH_3$, $H_2O$, $CO_2$, CO, C1-C4 hydrocarbons, etc) and a liquid phase 74 are recovered.

The vapour phase 73 from the high pressure low temperature (HPLT) separator 72 is treated in the hydrogen purification unit 42 from which hydrogen 43 is recovered to recycle it via the compressor 45 and the line 49 to the reactors 20 and/or 30. The gases containing the unwanted nitrogen-containing, sulphur-containing and oxygen-containing compounds are evacuated from the facility (stream 46).

The liquid phase 74 from the high pressure low temperature (HPLT) separator 72 is depressurized in the device 76 then sent to the fractionation system 50. Optionally, a medium pressure separator (not shown) after the depressurizer 76 may be installed in order to recover a vapour phase which is sent to the purification unit 42 and a liquid phase which is sent to the fractionation section 50.

The liquid phase 44 from the high pressure high temperature (HPHT) separation 40 is depressurized in the device 47 then sent to the fractionation system 50. Clearly, the fractions 74 and 44 may be sent together to the system 50 after depressurization. The fractionation system 50 comprises an atmospheric distillation system for producing a gaseous effluent 51, a fraction termed the light fraction 52 containing naphtha, kerosene and diesel in particular and a fraction termed the heavy fraction containing the vacuum gas oil 55. A portion of the heavy fraction may also be sent via the line 53 to the line 52 in order to be treated in the hydrocracker. All or a portion of the heavy fraction 55 is sent to a vacuum distillation column 56 to recover a phase 57 containing the vacuum residue, unconverted coal and ash, and a liquid phase 58 containing vacuum gas oil. This solid fraction 57 may then be burned and may play a role in the production of bitumens or as an additive for the production of asphalt cement, or may be supplied to a gasification unit to produce hydrogen and energy. The hydrogen produced may then be introduced into the hydroliquefaction process. At least a portion of the liquid phase 58 acts as a solvent for the liquefaction and is recycled after pressurization 59 via the line 15 to the chamber 14 for mixing with the coal. A portion of the liquid phase 58 not used as a solvent may be introduced via the line 54 to the line 52 for subsequent treatment in the hydrocracker.

The light fraction from the atmospheric distillation 52, optionally mixed with a portion of the heavy fraction from the atmospheric distillation 53 and a portion of the liquid phase from the vacuum distillation 54, is mixed with the recycled hydrogen 66, optionally pre heated in the chamber 60 and introduced via the line 62 to the top of the fixed bed hydrocracking reactor 80 operating in liquid and gas downflow mode and containing at least one hydrocracking catalyst. The hydrogen makeup is supplemented with makeup hydrogen 67. If necessary, the recycled and/or makeup hydrogen may also be introduced into the hydrocracking reactor between the various catalytic beds via lines 68 and 69 (quench).

The effluent treated in the reactor 80 is sent via the line 82 to a high pressure high temperature (HPHT) separator 84 from which a vapour phase 85 and a liquid phase 86 are recovered. The vapour phase 85 is sent, generally via an exchanger (not shown) or an air-cooled exchanger 87, for cooling to a high pressure low temperature (HPLT) separator 88 from which a vapour phase 90 containing gases ($H_2$, $H_2S$, $NH_3$, $H_2O$, $CO_2$, CO, C1-C4 hydrocarbons, etc) and a liquid phase 92 are recovered.

The vapour phase 90 from the high pressure low temperature (HPLT) separator 88 is treated in a hydrogen purification unit 94 from which hydrogen 95 is recovered for recycling to the hydrocracking reactor 80 via the compressor 96 and the line 66. The gases containing the unwanted nitrogen-containing, sulphur-containing and oxygen-containing compounds are evacuated from the facility (stream 97).

The liquid phase 92 from the high pressure low temperature (HPLT) separator 88 is depressurized in the device 93 then sent to the fractionation system 100. Possibly, a medium pressure separator (not shown) after the decompressor 93 may be installed in order to recover a vapour phase which is sent to the purification unit 94 and a liquid phase which is sent to the fractionation section 100.

The liquid phase 86 from the high pressure high temperature separation (HPHT) 84 is decompressed in the device 89 then sent to the fractionation system 100. Clearly, the fractions 86 and 92 may be sent together, after decompression, to the system 100. The fractionation system 100 comprises an atmospheric distillation system to produce a gaseous effluent 102, fractions termed light fractions and containing naphtha 104, kerosene 106 and diesel 108 in particular, and a residual fraction 110. All or a portion of the residual fraction may be recycled via the line 114 to the line 58 in order to prepare the suspension. The residual fraction may also be evacuated from the facility (stream 112), either for subsequent burning or to supply a hydrogen production gasification unit.

Figure 2:
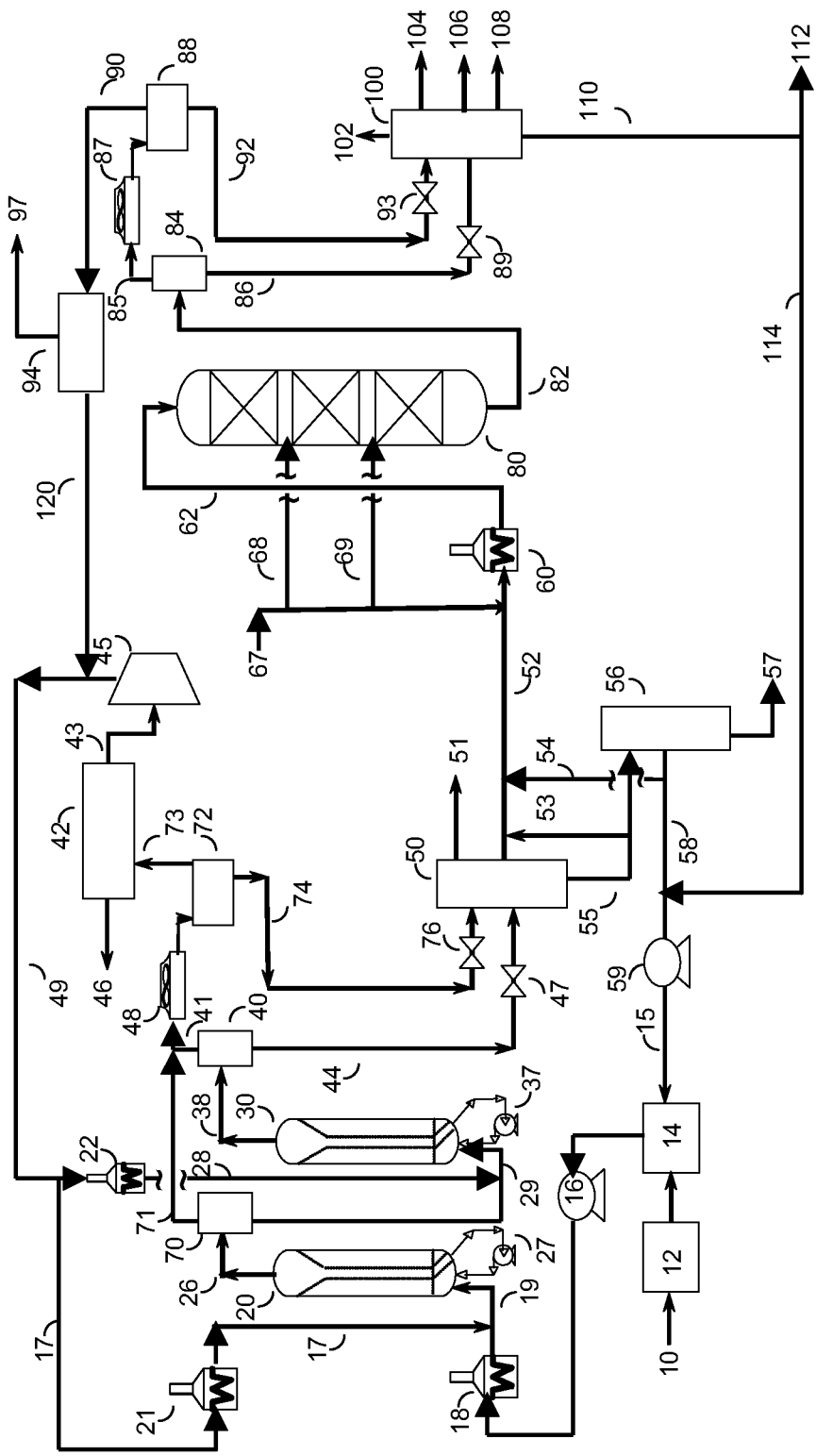

In FIG. 2 (option B), makeup hydrogen is introduced via line 67, mixed with the liquid fraction 52 from the atmospheric distillation after liquefaction. The mixture is heated (60) then introduced into the hydrocracking reactor 80. If necessary, makeup hydrogen may also be introduced into the hydrocracking reactor between the various catalytic beds via the lines 68 and 69 (quench). The effluent treated in the reactor 80 is sent via the line 82 to the high pressure high temperature (HPHT) separator system 84, then the high pressure low temperature (HPLT) separator 88 as described for FIG. 1 and from which a vapour phase 90 is recovered. The vapour phase 90 from the high pressure low temperature (HPLT) separator 88 is treated in the hydrogen purification unit 94 from which hydrogen 120 is recovered to inject it with recycled and compressed hydrogen deriving from the liquefaction into the line 49. A portion of the hydrogen is then reheated in the chamber 21, mixed with the coal/solvent suspension and injected via the line 19 into the first liquefaction reactor 20. Another portion of the hydrogen is injected, if necessary, into the second liquefaction reactor 30 via the line 28, optionally after heating in the chamber 22. The effluent treated in the reactor 30 is sent via the line 38 to the high pressure high temperature separator (HPHT) 40, then the high pressure low temperature (HPLT) 72 system, optionally mixed with the vapour phase 71 deriving from the optional inter-stage separator 73 as described for FIG. 1 and from which a vapour phase 73 is recovered. The vapour phase 73 from the high pressure low temperature (HPLT) separator 72 is treated in the hydrogen purification unit 42 from which hydrogen 43 is recovered for recycling via the compressor 45 and the line 49 to the reactors 20 and/or 30. Hydrogen originating from the hydrocracking is also injected into the line 49, as described above.

Figure 3:
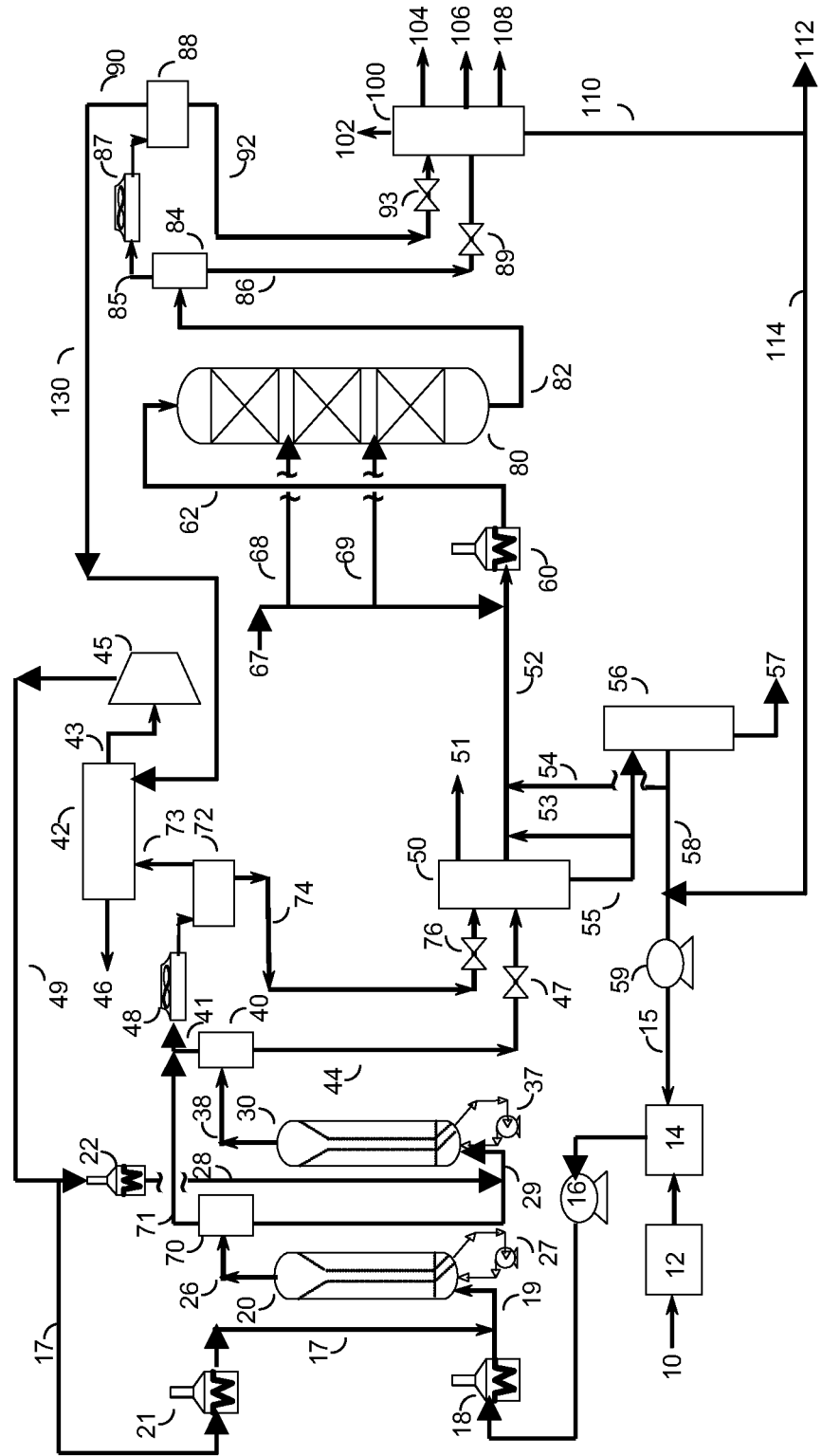

In FIG. 3 (option C), makeup hydrogen is introduced via line 67, mixed with the liquid fraction 52 from the atmospheric distillation after liquefaction. The mixture is heated (60) then introduced into the hydrocracking reactor 80. If necessary, makeup hydrogen may also be introduced into the hydrocracking reactor between the various catalytic beds via the lines 68 and 69 (quench). The effluent treated in the reactor 80 is sent via the line 82 to the system with the high pressure high temperature (HPHT) separator 84 then the high pressure low temperature (HPLT) separator 88 as described for FIG. 1 and from which a vapour phase 90 is recovered. The vapour phase 90 from the high pressure low temperature (HPLT) 88 separator is transported via 130 and treated in the hydrogen purification unit 42 which also treats recycled hydrogen originating from the liquefaction stage via the line 73. The purified hydrogen is then compressed, (45). A portion of the hydrogen is then reheated in the chamber 21, mixed with the coal/solvent suspension and injected via the line 19 into the first liquefaction reactor 20. Another portion of the hydrogen is injected, if necessary, into the second liquefaction reactor 30 via the line 28, optionally after heating in the chamber 22. The effluent treated in the reactor 30 is sent via the line 38 to the system with the high pressure high temperature separator (HPHT) 40 then the high pressure low temperature separator (HPLT) 72, optionally mixed with the vapour phase 71 deriving from the optional inter-stage separator 73, as described for FIG. 1 and from which a vapour phase 73 is recovered. The vapour phase 73 from the high pressure low temperature (HPLT) separator 72 is treated in the hydrogen purification unit 42 which also treats the hydrogen originating from the hydrocracking reactor 90 via the line 130 and from which hydrogen 43 is recovered to recycle it to the reactors 20 and/or 30 via the compressor 45 and the line 49.

Figure 4:
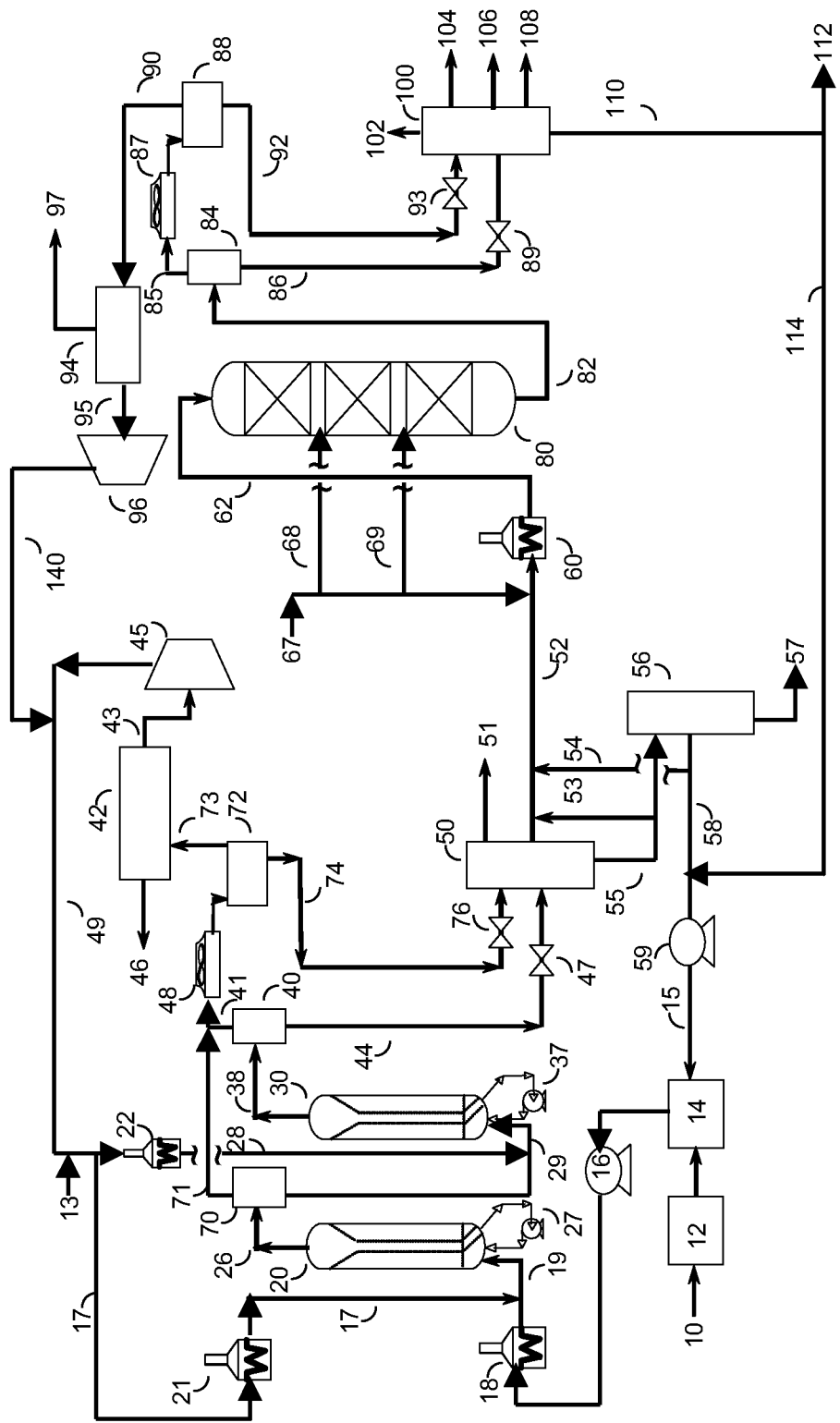

In FIG. 4 (option D), makeup hydrogen is introduced via the line 67, mixed with the liquid fraction 52 from the atmospheric distillation after liquefaction. The mixture is heated (60) then introduced into the hydrocracking reactor 80. If necessary, makeup hydrogen may also be introduced into the hydrocracking reactor between the various catalytic beds via the lines 68 and 69 (quench). The effluent treated in the reactor 80 is sent via the line 82 to the system with the high pressure high temperature (HPHT) separator 84 then the high pressure low temperature (HPLT) separator 88 as described for FIG. 1 and from which a vapour phase 90 is recovered. The vapour phase 90 from the high pressure low temperature (HPLT) separator 88 is treated in the hydrogen purification unit 94. The purified hydrogen is then compressed (96) and injected via the line 140 into the line 49 transporting recycled and purified hydrogen from the liquefaction reactors. A portion of the hydrogen is then reheated in the chamber 21, mixed with the coal/solvent suspension and injected via the line 19 into the first liquefaction reactor 20. Another portion of the hydrogen is injected, if necessary, into the second liquefaction reactor 30 via the line 28, optionally after heating in the chamber 22. If necessary, a supplemental addition of hydrogen may be carried out via the line 13 for the two liquefaction reactors. The effluent treated in the reactor 30 is sent via the line 38 to the system with the high pressure high temperature separator (HPHT) 40 then the high pressure low temperature (HPLT) separator 72, optionally as a mixture with the vapour phase 71 derived from the optional inter-stage separator 73, as described for FIG. 1 and from which a vapour phase 73 is recovered. The vapour phase 73 from the high pressure low temperature separator (HPLT) 72 is treated in the hydrogen purification unit 42 from which hydrogen (43) is recovered for recycling to reactors 20 and/or 30 via the compressor 45 and the line 49.

Figure 5:
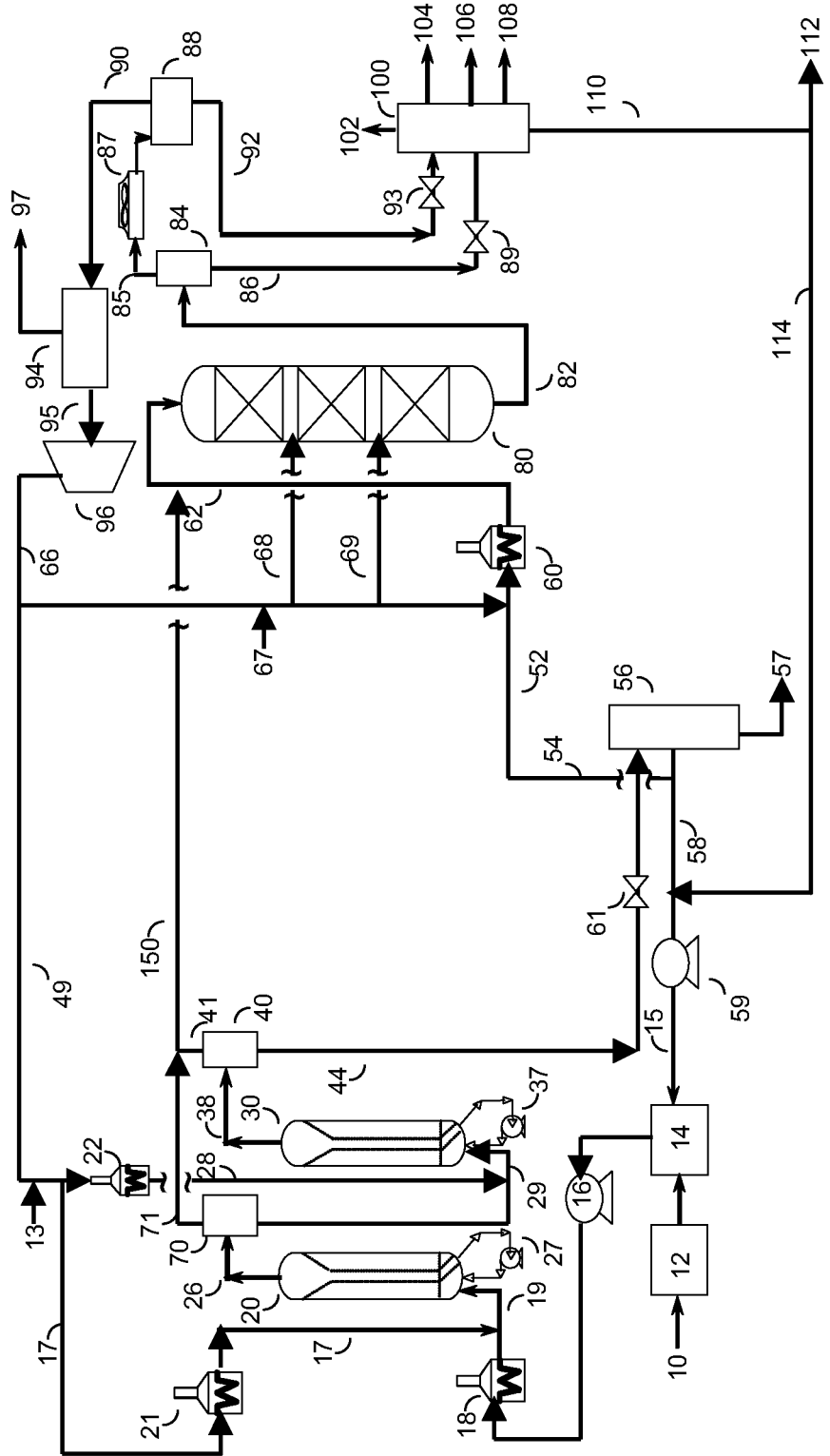
FIG. 5 shows a preferred implementation of the process in accordance with the integrated layout (intermediate separation without decompression).

In FIG. 5, illustrating the process of the invention with an integrated layout, i.e. with no intermediate decompression, the stage for the preparation of the coal/solvent suspension as well as the two liquefaction stages are as described in FIG. 1. The effluent treated in the second liquefaction reactor 30 is sent via the line 38 to a high pressure high temperature (HPHT) separator 40 from which a phase termed the light fraction 41 and a phase termed the residual fraction 44 are recovered. The light fraction 41 is sent directly, optionally as a mixture with the vapour phase 71 derived from the optional inter-stage separator 70 between the two reactors, via the line 150 into the hydrocracking reactor.

The residual fraction 44 from the high pressure high temperature (HPHT) separator 40 is depressurized in the device 61 then sent to the fractionation system 50. The fractionation system 56 comprises a vacuum distillation system and/or a solvent extraction system. In the case of vacuum distillation, a vacuum distillate fraction is recovered containing vacuum gas oil 58 and a solid fraction 57 containing vacuum residue, unconverted coal and ash. In the case of solvent extraction of the residual fraction 44, an oil extract 58 and a residual fraction 57 are recovered. A portion of the vacuum distillate (and/or oil extract) 58 may also be sent via the line 54 to the line 52 for treatment in the hydrocracker after mixing with makeup hydrogen 67 or hydrogen recycled via the line 66 and optional passage through a furnace 60. The vacuum residue may undergo solvent extraction (not shown). The solid fraction 57 may then be burned, or part of it may be used for the production of bitumens or as an additive for the production of asphalt cement, or may supply a gasification unit for the production of hydrogen and energy. The hydrogen thus produced may be introduced into the hydroliquefaction process. The vacuum distillate phase and/or the oil extract 58 is used at least in part as a solvent for liquefaction and is recycled after pressurization (59) via the line 15 to the chamber 14 for mixing with the coal.

Next in the process, the hydrocracking stage as well as the subsequent separation stage in order to recover the fuel bases are carried out as described in FIG. 1. The vapour phase 90 from the high pressure low temperature (HPLT) separator 88 is treated in the hydrogen purification unit 94 from which hydrogen (95) is recovered to recycle it via the compressor 96 and the line 66 to the hydrocracking reactor 80 or via the line 49 to two liquefaction reactors. In this configuration, the makeup hydrogen addition is carried out either integrally via the line 13 upstream of the liquefaction reactors, or to the lines 13 and 67 upstream of the liquefaction reactors and the hydrocracking reactor.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

EXAMPLES

Example 1

Liquefaction Stages

The two liquefaction stages in ebullated bed reactors were carried out with bituminous type coal which had been ground and dried. The operating conditions for the liquefaction are shown in Table 1; the liquefaction yields are shown in Table 2.

TABLE 1

| operating conditions for two-stage liquefaction | |
|---|---|
| Catalyst | NiMo/alumina |
| Temperature, reactor R1 (° C.) | 410 |
| Temperature, reactor R2 (° C.) | 440 |
| Pressure, MPa | 17 |
| HSV R1 (kg/h dry coal/kg catalyst) | 1.2 |
| HSV R2 (kg/h dry coal/kg catalyst) | 1.2 |
| $H_2$ inlet ($Nm^3$/kg dry coal) | 2.8 |
| Recycle, liquid/coal | 1.1 |

TABLE 2 yields for two-stage liquefaction (wt %/dry coal)

| | |
|---|---|
| C1-C4 (gas) | 13.53 |
| C5-199° C. | 14.00 |
| 199-260° C. | 9.79 |
| 260-343° C. | 21.52 |
| 343-388° C. | 13.54 |
| 388-454° C. | 4.04 |
| 454-523° C. | 1.20 |
| 523° C.+ | 2.41 |
| Unconverted coal + ash | 13.23 |
| $H_2O/CO/CO_2/NH_3/H_2S$ | 13.80 |

Example 2

Hydrocracking Stage

The C5-199° C., 199-260° C., 260-343° C. and 343-388° C. cuts obtained in the separation stage at the liquefaction outlet were sent to the hydrocracking stage. The portion of the heavy fraction which was not recycled, the unconverted coal and the ash were sent to the gasification stage in order to produce $H_2$. The operating conditions for hydrocracking are shown in Table 3; the hydrocracking yields are shown in Table 4.

TABLE 3 operating conditions for hydrocracking

| | |
|---|---|
| Catalyst | NiW/silica-alumina |
| Pressure, MPa | 16 |
| Temperature (° C.) | 390 |
| HSV ($Nm^3/h$ C5-388° C./$m^3$ of catalyst) | 0.5 |
| $H_2$/HC, reactor inlet ($Nm^3/h$ $H_2$/$Nm^3$ C5-388° C.) | 1500 |

TABLE 4 yields for hydrocracking (wt %/dry coal)

| | |
|---|---|
| $H_2S/NH_3/H_2O$ | 1.0 |
| C1-C4 | 0.81 |
| C5-200° C. | 19.16 |
| 200-250° C. | 11.83 |
| 250° C.+ | 27.73 |

TABLE 4-continued yields for hydrocracking (wt %/dry coal)

| | |
|---|---|
| 200° C.+ | 39.56 |
| 343° C.+ | 4.02 |

Table 5 shows the physico-chemical properties of the 200° C.+ cut of the hydrocracked coal from liquefaction as well as the properties of the kerosene cut and the gas oil cut obtained by distillation of this 200° C.+ cut. In particular, the cold properties of the kerosene cut and the gas oil cut, the CFR cetane number of the gas oil cut as well as the smoke point of the kerosene cut were measured.

TABLE 5 physico-chemical properties of 200° C.+, kerosene 200-250° C. and gas oil 250° C.+ cuts

| Analysis (analysis method) | Units | 200° C.+ cut | Kerosene cut | Gas oil cut | Reference method |
|---|---|---|---|---|---|
| Yield, physical distillation | % m/m | — | 29.9 | 70.1 | ASTM D 5236 |
| Density at 15° C. | g/cm³ | 0.8831 | 0.8676 | 0.8901 | NF EN ISO 12185 |
| Hydrogen, NMR | % m/m | 13.31 | 13.34 | 13.17 | ASTM D7171 |
| Nitrogen | ppm, m/m | <0.3 | <0.3 | <0.5 | ASTM 4629 |
| Sulphur (UV) | ppm, m/m | 1.7 | <2 | <2 | ASTM D 2622 or NF EN ISO 20884 |
| Smoke point | mm | | 22 | | ISO 3014 |
| Crystal disappearance point | ° C. | | −66 | | ASTM D 7153 |
| Filterability limit temperature | ° C. | −15 | | −3 | NF EN 116 |
| Cetane number, CFR | | 50 | 40 | 54 | ASTM D 613/86 |
| 0.5% SD | ° C. | 194 | 190 | 239 | ASTM D 2887 |
| 5% SD | | 212 | 202 | 252 | |
| 50% SD | | 269 | 238 | 290 | |
| 95% SD | | 339 | 257 | 353 | |
| 99.5% SD | | 389 | 263 | 398 | |

The chemical composition of the 200° C.+ cut, the kerosene cut and the diesel cut was analyzed. Table 6 shows the results of the analyses by chemical family.

TABLE 6 chemical composition of 200° C.+, kerosene, gas oil cuts (wt %)

| | 200° C.+ cut | Kerosene cut | Gas oil cut |
|---|---|---|---|
| Paraffins (total) | 8.4 | 4.3 | 10.1 |
| Naphthenes (total) | 75.9 | 89.7 | 70.1 |
| Aromatics (total) | 15.7 | 6.0 | 19.8 |

The chemical composition of the kerosene and gas oil cuts cited in the example is substantially dominated by the naphthene, naphtheno-aromatic and aromatic structures with few paraffins; as a consequence, it appears to be very different from conventional or converted oil distillates. Note the high density for kerosene and also the high smoke point. Note also that the gas oil density is high and its cetane number is at least 50.

Example 3

Hydrotreatment Stage (Not in Accordance With the Invention)

In order to explain the hydrotreatment effect on the liquefaction effluent, a complementary test was carried out by hydrotreating the C5-199° C., 199-260° C., 260-343° C. and 343-388° C. cuts obtained in the separation stage at the liquefaction outlet of Example 1. The operating conditions for the fixed bed hydrotreatment are shown in Table 7.

TABLE 7

| operating conditions for hydrotreatment | |
|---|---|
| Catalyst | NiMo/alumina |
| Pressure, MPa | 13 |
| Temperature (° C.) | 375 |
| HSV (Nm³/h C5-388° C./m³ of catalyst) | 0.75 |
| H₂/HC (Nm³/h H₂/Nm³ C5-388° C.) | 300 |

The ASTM D 3238 analyses were carried out on the 200-350° C. (kerosene+diesel) cuts obtained using the H-Coal TS process under the conditions of Example 1, obtained after hydrocracking (HCK) under the conditions of Example 2 and after hydrotreatment (HDT) under the conditions of Example 3. These analyses as shown in Table 8.

TABLE 8 change in structure of 200-350° C. cut as function of treatment

| | | Using H-Coal TS | After HDT | After HCK | Analysis method |
|---|---|---|---|---|---|
| Aromatic C | % mol | 26.4 | 19.4 | 3.3 | ASTM D 3238 |
| Paraffinic C | % mol | 17.5 | 19.6 | 25.6 | ASTM D 3238 |
| Naphthenic C | % mol | 56.1 | 61 | 71.1 | ASTM D 3238 |
| CFR cetane number | | 38 | 37 | 50 | ASTM D 613/86 |

The results clearly show an improvement in the cetane number after HCK under the conditions of Example 2 which is explained by a large reduction in the aromatics content to the advantage of the naphthenes and paraffins obtained by cracking the naphthenes. The naphthenes content is very high, which is not the case with cuts derived from oil feeds. Naphthenes are known for their moderate ignition quality in diesel engines and do not generally have very high cetane indices, typically 30 to 45. Surprisingly, the cetane number is excellent and superior to European specifications or US specifications despite a high naphthenes content. The example also shows that hydrotreatment alone cannot be used to obtain a gas oil with a cetane number that complies with European or US specifications.

The entire disclosures of all applications, patents and publications, cited herein and of corresponding FR application No. 10/01080, filed Mar. 18, 2010, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for the conversion of coal into fuel bases, comprising the following stages:
a) preparing a suspension of coal particles in a solvent;
b) liquefying said suspension in the presence of hydrogen in at least one ebullated bed reactor containing a supported catalyst;
c) liquefying at least a portion of the effluent obtained in stage b) in the presence of hydrogen in at least one ebullated bed reactor containing a supported catalyst and operating at a temperature at least 10° C. higher than that of stage b);
d) separating the effluent obtained at the end of stage c) into a light hydrocarbon fraction containing compounds boiling at at most 500° C. and a residual fraction;
e) hydrocracking, in the presence of hydrogen, at least a portion of the light hydrocarbon fraction obtained at the end of stage d) in at least one fixed bed reactor containing a hydrocracking catalyst, the conversion of the 200° C.+ fraction in the hydrocracking stage being more than 10% by weight;
separating the effluent obtained at the end of stage e) into at least one liquid fraction containing naphtha, kerosene and/or diesel and a heavy fraction;
and wherein
the fraction termed the light hydrocarbon fraction obtained at the end of stage d) is fractionated by atmospheric distillation into an atmospheric distillate fraction and an atmospheric residue fraction, said atmospheric residue fraction being fractionated by vacuum distillation into a vacuum distillate fraction containing vacuum gas oil and a vacuum residue fraction, said atmospheric residue fraction and/or the vacuum residue fraction optionally undergoing solvent extraction to obtain an oil extract and an insoluble fraction, a portion or all of said vacuum distillate fraction containing vacuum gas oil and/or oil extract being recycled to stage a) as a solvent, said atmospheric distillate fraction being sent to the hydrocracking stage, optionally as a mixture with other co-feeds.

2. A process according to claim 1, in which stage b) is operated at a temperature in the range of 300° C. to 440° C., at a total pressure in the range of 15 to 25 MPa, at a mass velocity per hour defined by the following formula ((tonnes of feed/h)/tonnes of catalyst) in the range of 0.1 to 5 h⁻¹ and a hydrogen/feed ratio in the range 0.1 to 5 Nm³/kg and in which stage c) is operated at a temperature in the range of 350° C. to 470° C., at a total pressure in the range of 15 to 25 MPa, at a mass velocity per hour defined by the following formula ((tonnes of feed/h)/tonnes of catalyst) in the range of 0.1 to 5 h⁻¹ and a hydrogen/feed ratio in the range of 0.1 to 5 Nm³/kg.

3. A process according to claim 1, in which stage e) is operated at a temperature in the range of 330° C. to 435° C., at a pressure in the range of 3 to 20 MPa, at a space velocity in the range of 0.2 to 3 h⁻¹, and the quantity of hydrogen introduced is such that the volume ratio of hydrogen to hydrocarbons is in the range of 100 to 3000 Nm³/m³.

4. A process according to claim 1, in which the cut point for the separation of stage d) is in the range of 200° C. to 450° C.

5. A process according to claim 1, in which the cut point for the separation of stage d) is in the range of 100° C. to 300° C.

6. A process according to claim 1, in which stage e) is operated at a temperature in the range of 250° C. to 480° C., at a pressure in the range of 2 to 25 MPa, at a space velocity in the range of 0.1 to 6 h⁻¹, and the quantity of hydrogen introduced is such that the volume ratio of hydrogen to hydrocarbons is in the range of 80 to 5000 Nm³/m³.

7. A process according to claim 1, in which the separation stage d) is carried out without decompression and in which the residual fraction, after cooling, is vacuum distilled and/or solvent extracted to obtain a vacuum distillate containing a vacuum gas oil and/or an oil extract, all or at least a portion of said vacuum gas oil and/or said oil extract is recycled as a solvent to stage a) and/or is optionally sent to the hydrocracking stage, mixed with the fraction termed the light fraction.

8. A process according to claim 1, in which said coal is co-treated with a feed selected from the group consisting of oil residues, vacuum distillates of oil origin, crude oils, synthetic crudes, topped crude oils, deasphalted oils, resins from deasphalting, asphalts from deasphalting, tars from deasphalting, derivatives from oil conversion processes, aromatic extracts derived from production lines for lubricant bases, bituminous sands, derivatives of bituminous sands, bituminous schists, derivatives of bituminous schists, industrial hydrocarbon waste, industrial polymer waste, organic household waste, plastic household waste, animal oils, animal fats, vegetable oils, vegetable fats, tars, residues that cannot be upgraded derived from the gasification of biomass, residues that are difficult to upgrade derived from the gasification of biomass, coal residues, oil residues, lignocellulose biomass, one or more constituents of cellulose biomass selected from the group consisting of cellulose, hemicellulose and lignin, algae, wood charcoal, oil from the pyrolysis of lignocellulose biomass, oil from the pyrolysis of algae, pyrolytic lignin, products of the hydrothermal conversion of lignocellulose biomass, products of the hydrothermal conversion of algae, activated sludge from water treatment stations, and mixtures thereof.

9. A process according to claim 1, in which the catalyst from liquefaction stages b) and c) comprises at least one metal from group VIII selected from the group consisting of Ni and Co, optionally at least one metal from group VIB selected from the group consisting of Mo and W, on a mineral support selected from the group consisting of alumina, silica, silica-aluminas, magnesia, clays and mixtures of at least two of said minerals.

10. A process according to claim 1, in which in stage e) the conversion of the 200° C.+ fraction in the hydrocracking stage is in the range of 20% to 100% by weight.

11. A process according to claim 1, in which stage e) is operated at a temperature of more than 200° C., at a pressure of more than 1 MPa, at a space velocity in the range of 0.1 to 20 $h^{-1}$, and the quantity of hydrogen introduced is such that the volume ratio of hydrogen to hydrocarbons is in the range of 80 to 5000 $Nm^3/m^3$.

12. A process according to claim 1, in which the catalyst for the hydrocracking stage e) comprises at least one metal from group VIII selected from the group consisting of Ni and Co and at least one metal from group VIB selected from the group consisting of Mo and W, on an amorphous silica-alumina and/or zeolitic type support.

13. A process according to claim 1, in which the makeup hydrogen is added to the hydrocracking stage e),
and in which the pressure in the hydrocracking stage e) is higher than the pressure in the liquefaction stages b) and c),
and in which the hydrogen recycled to the hydrocracking stage e) is recycled to the liquefaction stages b) and c).

14. A process according to claim 1, in which the makeup hydrogen is added to the hydrocracking stage,
and in which the pressure in the hydrocracking stage e) is equivalent to the pressure in the liquefaction stages b) and c),
and in which the recycled hydrogen from the hydrocracking stage e) is recycled to the liquefaction stages b) and c).

15. A process according to claim 1, in which makeup hydrogen is added to the hydrocracking stage, optionally supplemented by a hydrogen makeup added to the liquefaction stages b) and c),
and in which the pressure in the hydrocracking stage e) is lower than the pressure in the liquefaction stages b) and c),
and in which the hydrogen recycled to the hydrocracking stage e) is recycled to the liquefaction stages b) and c).

16. A process according to claim 1, in which the cut point for the separation of stage d) is in the range of 100° C. to 300° C. or in the range of 200° C. to 450° C.

* * * * *